(12) United States Patent
Baba

(10) Patent No.: US 9,645,383 B2
(45) Date of Patent: May 9, 2017

(54) OBJECTIVE LENS FOR ENDOSCOPE AND ENDOSCOPE

(71) Applicant: FUJIFILM Corporation, Tokyo (JP)

(72) Inventor: Tomoyuki Baba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/013,481

(22) Filed: Feb. 2, 2016

(65) Prior Publication Data

US 2016/0238831 A1 Aug. 18, 2016

(30) Foreign Application Priority Data

Feb. 17, 2015 (JP) ................ 2015-028216

(51) Int. Cl.
*G02B 9/00* (2006.01)
*G02B 23/24* (2006.01)
*G02B 13/06* (2006.01)

(52) U.S. Cl.
CPC .......... *G02B 23/243* (2013.01); *G02B 13/06* (2013.01)

(58) Field of Classification Search
CPC . A61B 1/0638; A61B 1/00188; A61B 5/0084; A61B 1/05; G02B 5/005; G02B 27/58; G02B 13/24; G02B 13/00

USPC ........ 359/738, 740, 753, 754, 783; 600/168, 600/167, 160

See application file for complete search history.

(56) References Cited

U.S. PATENT DOCUMENTS

| 2004/0125469 | A1 | 7/2004 | Miyano |
| 2009/0086017 | A1 | 4/2009 | Miyano |
| 2010/0305405 | A1 | 12/2010 | Miyano |

FOREIGN PATENT DOCUMENTS

| JP | 2596827 B2 | 4/1997 |
| JP | 2009-080413 A | 4/2009 |
| JP | 4265909 B2 | 5/2009 |
| JP | 2011-227380 A | 11/2011 |
| JP | 4999078 B2 | 8/2012 |
| JP | 5324321 B2 | 10/2013 |
| JP | 5363354 B2 | 12/2013 |

*Primary Examiner* — James Greece
(74) *Attorney, Agent, or Firm* — Studebaker & Brackett PC

(57) ABSTRACT

An objective lens for an endoscope consists of, in order from the object side, a negative front group, an aperture stop and a positive rear group. The front group consists of, in order from the object side, a negative first lens and a cemented lens of a negative second lens and a positive third lens cemented together. The rear group consists of, in order from the object side, a positive lens and a cemented lens of a positive lens and a negative lens cemented together. The objective lens for an endoscope satisfies predetermined conditional expressions.

12 Claims, 30 Drawing Sheets

EXAMPLE 2

FIG. 18　EXAMPLE 4

FIG.20 EXAMPLE 6

FIG.21 EXAMPLE 7

FIG.22 EXAMPLE 8

FIG.24 EXAMPLE 10

OBJECTIVE LENS FOR ENDOSCOPE AND ENDOSCOPE

CROSS-REFERENCE TO RELATED APPLICATION

The present application claims priority under 35 U.S.C. §119 to Japanese Patent Application No. 2015-028216, filed on Feb. 17, 2015. The above application is hereby expressly incorporated by reference, in its entirety, into the present application.

BACKGROUND

The present disclosure relates to an objective lens for an endoscope and an endoscope including this objective lens for an endoscope.

Conventionally, endoscopes were used in medical fields to perform observation of the inside of a patient's body, treatment or the like. Japanese Patent No. 2596827 (Patent Document 1), Japanese Unexamined Patent Publication No. 2009-080413 (Patent Document 2), Japanese Patent No. 4265909 (Patent Document 3), Japanese Unexamined Patent Publication No. 2011-227380 (Patent Document 4), Japanese Patent No. 4999078 (Patent Document 5), Japanese Patent No. 5363354 (Patent Document 6) and Japanese Patent No. 5324321 (Patent Document 7) disclose lens systems usable as an objective lens for an endoscope. In these lens systems, a lens system consists of, in order from the object side, a front group having negative refractive power, a stop and a rear group having positive refractive power.

SUMMARY

An objective lens for an endoscope needs to be a wide angle lens system, which can observe a wider range, to improve a detection rate of a lesion. Further, in recent years, an image imaged by an endoscope is converted into electrical signals, and image processing is performed on the electrical signals to generate an image in which blood vessels, a surface structure or the like has been emphasized, and observation of a lesion region that has become more noticeable is performed. In such observation, a short-wavelength laser light source with wavelengths in the vicinity of 400 nm is often used, as a light source, in addition to a white light source. Therefore, an objective lens for an endoscope in which chromatic aberrations are excellently corrected in a whole range from a short wavelength range in the vicinity of the wavelength of 400 nm to a visible range is needed.

However, a lateral chromatic aberration tends to increase as an angle of view is wider. Therefore, it is not easy to achieve both a wider angle of view and excellent correction of chromatic aberrations at the same time. None of the lens systems disclosed in Patent Documents 1 through 6 is recognized as having achieved a wide angle of view to such an extent as requested in recent years. Further, when a short wavelength range in the vicinity of the wavelength of 400 nm is also taken into consideration, the lens system disclosed in Patent Document 7 is not recognized as a lens system in which a longitudinal chromatic aberration and a lateral chromatic aberration are excellently corrected for a whole range from this short wavelength range to a visible range.

In view of the foregoing circumstances, the present disclosure provides an objective lens for an endoscope having a wide angle of view and high optical performance in which chromatic aberrations are excellently corrected in a whole range from a short wavelength range in the vicinity of the wavelength of 400 nm to a visible range and an endoscope including this objective lens for an endoscope.

An objective lens for an endoscope consists essentially of, in order from the object side, a front group having negative refractive power, an aperture stop and a rear group having positive refractive power. The front group consists essentially of, in order from the object side, a first lens having negative refractive power and a first cemented lens consisting of, in order from the object side, a second lens having negative refractive power and a third lens having positive refractive power cemented together. The rear group consists essentially of, in order from the object side, a fourth lens having positive refractive power and a second cemented lens consisting of, in order from the object side, a fifth lens having positive refractive power and a sixth lens having negative refractive power cemented together. Further, the following conditional expressions (1) and (2) are satisfied:

$$-0.8 < f/fA < -0.2 \quad (1); \text{ and}$$

$$|vd2 - vd3| < 15.0 \quad (2), \text{ where}$$

f: a focal length of an entire system,
fA: a focal length of the front group,
vd2: an Abbe number of the second lens for d-line, and
vd3: an Abbe number of the third lens for d-line.

In the objective lens for an endoscope of the present disclosure, it is desirable that any one of or an arbitrary combination of the following conditional expressions (3) through (6) and (1-1) through (6-1) is satisfied:

$$-2.5 < f/f2 < -0.8 \quad (3);$$

$$0.9 < f/f3 < 2.0 \quad (4);$$

$$42.5 < |vd5 - vd6| < 100 \quad (5);$$

$$0.1 < dAB/f < 1.0 \quad (6);$$

$$-0.7 < f/fA < -0.3 \quad (1\text{-}1);$$

$$|vd2 - vd3| < 12.5 \quad (2\text{-}1);$$

$$-2.0 < f/f2 < -0.85 \quad (3\text{-}1);$$

$$0.95 < f/f3 < 1.65 \quad (4\text{-}1);$$

$$43.5 < |vd5 - vd6| < 80 \quad (5\text{-}1); \text{ and}$$

$$0.15 < dAB/f < 0.85 \quad (6\text{-}1), \text{ where}$$

f: a focal length of an entire system,
f2: a focal length of the second lens,
f3: a focal length of the third lens,
fA: a focal length of the front group,
vd2: an Abbe number of the second lens for d-line,
vd3: an Abbe number of the third lens for d-line.
vd5: an Abbe number of the fifth lens for d-line,
vd6: an Abbe number of the sixth lens for d-line, and
dAB: a distance on an optical axis between the front group and the rear group.

Here, the phrase "consists essentially of" means that a lens having substantially no refractive power, an optical element, such as a stop and a cover glass, other than lenses, a lens flange, a lens barrel and the like may be included in addition to the mentioned composition elements.

Further, the sign of refractive power in the objective lens for an endoscope of the present disclosure is considered in a paraxial region when an aspheric surface is included.

An endoscope of the present disclosure includes the aforementioned objective lens for an endoscope of the present disclosure.

The objective lens for an endoscope of the present disclosure is a retro-focus type lens system in which a negative front group and a positive rear group are arranged. In the retro-focus type lens system, the configuration of the front group and the rear group is appropriately set, and especially, a cemented lens is arranged on either side of an aperture stop and predetermined conditional expressions are satisfied. Therefore, it is possible to achieve a lens system having a wide angle of view and high optical performance in which chromatic aberrations are excellently corrected in a whole range from a short wavelength range in the vicinity of the wavelength of 400 nm to a visible range.

The endoscope of the present disclosure includes the objective lens for an endoscope of the present disclosure. Therefore, observation in a wide field of view is possible, and an excellent image is obtainable in a whole range from a short wavelength range in the vicinity of the wavelength of 400 nm to a visible range.

DESCRIPTION OF THE PREFERRED EMBODIMENTS

Figure 1:
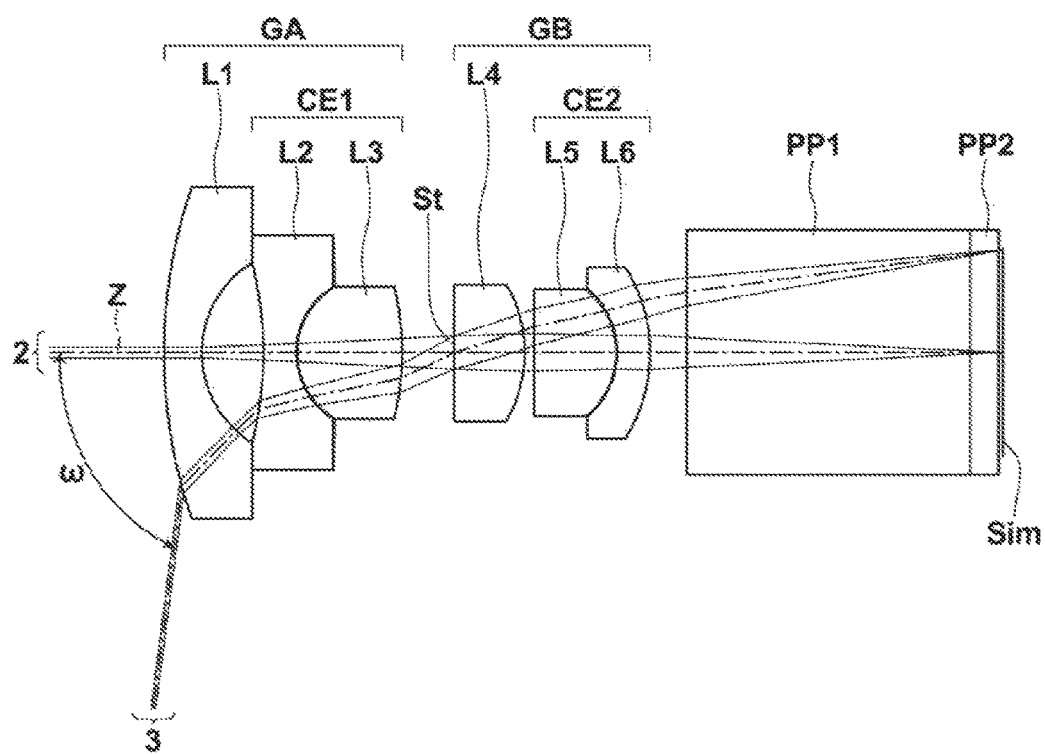
FIG. 1 is a diagram illustrating an example of the configuration of an objective lens for an endoscope according to an embodiment of the present disclosure, and which is a sectional view illustrating the configuration of an objective lens for an endoscope in Example 1 of the present disclosure and optical paths.

Hereinafter, embodiments of the present disclosure will be described in detail with reference to drawings. FIG. 1 is a diagram illustrating the configuration of an objective lens for an endoscope according to an embodiment of the present disclosure and optical paths at a sectional plane including optical axis Z. FIG. 1 corresponds to the configuration of a lens in Example 1, which will be described later. In FIG. 1, the left side is the object side, and the right side is the image side. As the optical paths, the optical path of axial rays 2 and the optical path of rays 3 at a maximum angle of view are illustrated. Further, half value to of the maximum full angle of view is also illustrated.

An objective lens for an endoscope of the present disclosure consists essentially of, in order from the object side along optical axis Z, front group GA having negative refractive power, aperture stop St and rear group GB having positive refractive power. Since the negative lens group and the positive lens group are arranged in order from the object side, the objective lens is a retro-focus type lens system. Therefore, a back focus is securable, and an optical system that can appropriately cope with a wide angle of field of view required in an endoscope is obtainable. Here, aperture stop St illustrated in FIG. 1 does not necessarily represent the size nor the shape of the aperture stop, but the position of the aperture stop on optical axis Z.

FIG. 1 illustrates an example in which optical members PP1, PP2, each of which has an entrance surface and an exit surface parallel to each other, are arranged toward the image side of second cemented lens CE2. However, configuration in which optical members PP1, PP2 are omitted is possible in the present disclosure. Optical members PP1, PP2 are assumed to be an optical path conversion prism for bending optical paths, a filter, a cover glass or the like. When the optical path conversion prism is used, the optical paths are bent. However, FIG. 1 illustrates the diagram in which optical paths are developed for the purpose of facilitating understanding.

Front group GA consists essentially of, in order from the object side, first lens L1 having negative refractive power and first cemented lens CE1. First cemented lens CE1 consists of, in order from the object side, second lens L2 having negative refractive power and third lens L3 having positive refractive power cemented together. Distortion and curvature of field are excellently correctable by negative first lens L1. Further, a longitudinal chromatic aberration and a lateral chromatic aberration are excellently correctable by first cemented lens CE1.

Rear group GB consists essentially of, in order from the object side, fourth lens L4 having positive refractive power and second cemented lens CE2. Second cemented lens CE2 consists of, in order from the object side, fifth lens L5 having positive refractive power and sixth lens L6 having negative refractive power cemented together. A spherical aberration is excellently correctable by positive fourth lens L4. Further, a lateral chromatic aberration is excellently correctable by second cemented lens CE2.

Further, this objective lens for an endoscope satisfies the following conditional expressions (1) and (2):

$$-0.8 < f/fA < -0.2 \qquad (1); \text{ and}$$

$$|vd2-vd3| < 15.0 \qquad (2), \text{ where}$$

f: a focal length of an entire system,
fA: a focal length of the front group,
vd2: an Abbe number of the second lens for d-line, and
vd3: an Abbe number of the third lens for d-line.

When the lower limit of conditional expression (1) is satisfied, it is possible to appropriately suppress distortion and curvature of field. When the upper limit of conditional expression (1) is satisfied, it is possible to widen the angle of a field of view, in other words, that is advantageous to widening the angle of view. It is more desirable that the following conditional expression (1-1) is satisfied to further improve the aforementioned effect about conditional expression (1):

$$-0.7 < f/fA < -0.3 \qquad (1\text{-}1).$$

Conditional expression (2) is about first cemented lens CE1. When negative second lens L2 and positive third lens L3 are cemented together, and the material of these lenses is selected so as to satisfy conditional expression (2), it is possible to excellently correct both a longitudinal chromatic aberration and a lateral chromatic aberration in a whole range from a short wavelength range in the vicinity of the wavelength of 400 nm to a visible range. It is more desirable that the following conditional expression (2-1) is satisfied to further improve the aforementioned effect about conditional expression (2):

$$|vd2-vd3| < 12.5 \qquad (2\text{-}1).$$

Further, it is desirable that this objective lens for an endoscope satisfies any one of or an arbitrary combination of the following conditional expressions (3) through (6):

$$-2.5 < f/f2 < -0.8 \qquad (3);$$

$$0.9 < f/f3 < 2.0 \qquad (4);$$

$$42.5 < |vd5-vd6| < 100 \qquad (5);$$

$$0.1 < dAB/f < 1.0 \qquad (6), \text{ where}$$

f: a focal length of an entire system,
f2: a focal length of the second lens,
f3: a focal length of the third lens,
vd5: an Abbe number of the fifth lens for d-line,
vd6: an Abbe number of the sixth lens for d-line, and
dAB: a distance on an optical axis between the front group and the rear group.

When the value of f/f2 is set in the range of conditional expression (3), it is possible to distribute negative refractive power to first lens L1 and second lens L2 in a well-balanced manner, and to excellently correct distortion and curvature of field. It is more desirable that the following conditional expression (3-1) is satisfied to further improve the aforementioned effect about conditional expression (3):

$$-2.0 < f/f2 < -0.85 \qquad (3\text{-}1).$$

When the lower limit of conditional expression (4) is satisfied, it is possible to suppress an increase in the diameter of first lens L1, and the lens system becomes appropriate as an objective lens for an endoscope, in which a small diameter is desirable. When the upper limit of conditional expression (4) is satisfied, it is possible to excellently correct a spherical aberration and distortion. It is more desirable that the following conditional expression (4-1) is satisfied to further improve the aforementioned effect about conditional expression (4):

$$0.95 < f/f3 < 1.65 \quad (4\text{-}1).$$

Conditional expressions (3) and (4) are about the refractive power of the negative lens and the positive lens constituting the first cemented lens CE1, respectively. It is more desirable that conditional expressions (3) and (4) are satisfied at the same time. When conditional expressions (3) and (4) are satisfied at the same time, that is advantageous to obtaining excellent performance while suppressing an increase in the diameter of the lens system.

When the lower limit of conditional expression (5) is satisfied, it is possible to excellently correct a lateral chromatic aberration. When the upper limit of conditional expression (5) is satisfied, it is possible to suppress excessive correction of a lateral chromatic aberration. It is more desirable that the following conditional expression (5-1) is satisfied to further improve the aforementioned effect about conditional expression (5):

$$43.5 < |vd5 - vd6| < 80 \quad (5\text{-}1).$$

When the lower limit of conditional expression (6) is satisfied, it is possible to excellently correct a spherical aberration. When the upper limit of conditional expression (6) is satisfied, it is possible to suppress an increase in the size of the lens system. It is possible to suppress especially the length of the lens system in the direction of the optical axis. It is more desirable that the following conditional expression (6-1) is satisfied to further improve the aforementioned effect about conditional expression (6):

$$0.15 < dAB/f < 0.85 \quad (6\text{-}1).$$

It is desirable that the aforementioned desirable configuration is appropriately selected based on what is needed as an objective lens for an endoscope. It is possible to realize an optical system that can cope with more excellent optical performance and higher specification by appropriately adopting desirable configuration.

The objective lens for an endoscope according to an embodiment of the present disclosure is adoptable as a lens system that needs to have a wide angle of view, and also to have high optical performance in which chromatic aberrations are excellently corrected in a whole range from a short wavelength range in the vicinity of the wavelength of 400 nm to a visible range. Here, a lens system having a wide angle of view means a lens system having a maximum full angle of view of 160° or greater.

Next, numerical value examples of the objective lens for an endoscope of the present disclosure will be described. The following data of Examples 1 through 14 are normalized data so that the focal length of the entire system is 1.000. Further, the condition of using an endoscope is taken into consideration, and basic lens data and aberration diagrams of Examples 1 through 14, which will be described next, show those of cases in which an object (not illustrated) that is present at a finite distance and has curvature is observed.

Example 1

FIG. 1 is a diagram illustrating the lens configuration and optical paths of an objective lens for an endoscope in Example 1. Since the method for illustrating the drawing has been described already, the explanation is not repeated here. Table 1 shows basic lens data of the objective lens for an endoscope in Example 1. Table 2 shows specification. In Table 1, the column of Si shows the surface numbers of i-th (i=1, 2, 3, . . . ) surfaces that sequentially increase toward the image side when the object-side surface of a composition element closest to the object side is the first surface. The column of Ri shows the curvature radius of the i-th surface. The column of Di shows a surface distance, on optical axis Z, between the i-th surface and the (i+1)th surface. Here, the sign of a curvature radius is positive when the shape of a surface is convex toward the object side, and negative when the shape of a surface is convex toward the image side.

In FIG. 1, the column of Ndj shows the refractive index of a j-th (j=1, 2, 3, . . . ) optical element for d-line (wavelength is 587.6 nm) when the optical element closest to the object side is the first optical element and the value of j sequentially increases toward the image side. The column of vdj shows the Abbe number of the j-th optical element for d-line. Table 1 shows also an object, aperture stop St, optical members PP1, PP2 and image plane Sim. In Table 1, the terms "OBJ", "a surface number and (St)", and "IMG" are written in the rows of surface numbers corresponding to the object, aperture stop St, and image plane Sim, respectively.

Table 2 shows the values for d-line of focal length f of the entire system, back focus Bf of the entire system, F-number FNo., and full angle 2ω of view. In the row of 2ω, "[°]" means that the unit is degrees. In each of the following tables, numerical values rounded at predetermined places are written.

TABLE 1

| Si | Ri | Di | Ndj | vdj |
|---|---|---|---|---|
| OBJ | 14.03051 | 14.0305 | | |
| 1 | 5.90217 | 0.4677 | 1.88299 | 40.78 |
| 2 | 1.23352 | 0.7666 | | |
| 3 | −4.26411 | 0.4209 | 2.00100 | 29.13 |
| 4 | 0.90965 | 1.2954 | 1.80809 | 22.76 |
| 5 | −3.34394 | 0.6461 | | |
| 6(St) | ∞ | 0.0000 | | |
| 7 | ∞ | 0.8817 | 1.48749 | 70.24 |
| 8 | −1.52465 | 0.1169 | | |
| 9 | ∞ | 1.0267 | 1.59522 | 67.73 |
| 10 | −0.97278 | 0.4092 | 1.84666 | 23.78 |
| 11 | −1.86372 | 0.4553 | | |
| 12 | ∞ | 3.5076 | 1.55919 | 53.90 |
| 13 | ∞ | 0.3508 | 1.51633 | 64.06 |
| 14 | ∞ | 0.0584 | | |
| IMG | ∞ | | | |

TABLE 2

| | |
|---|---|
| f | 1.000 |
| Bf | 2.928 |
| FNo. | 7.18 |
| 2ω[°] | 164.8 |

Figure 15:
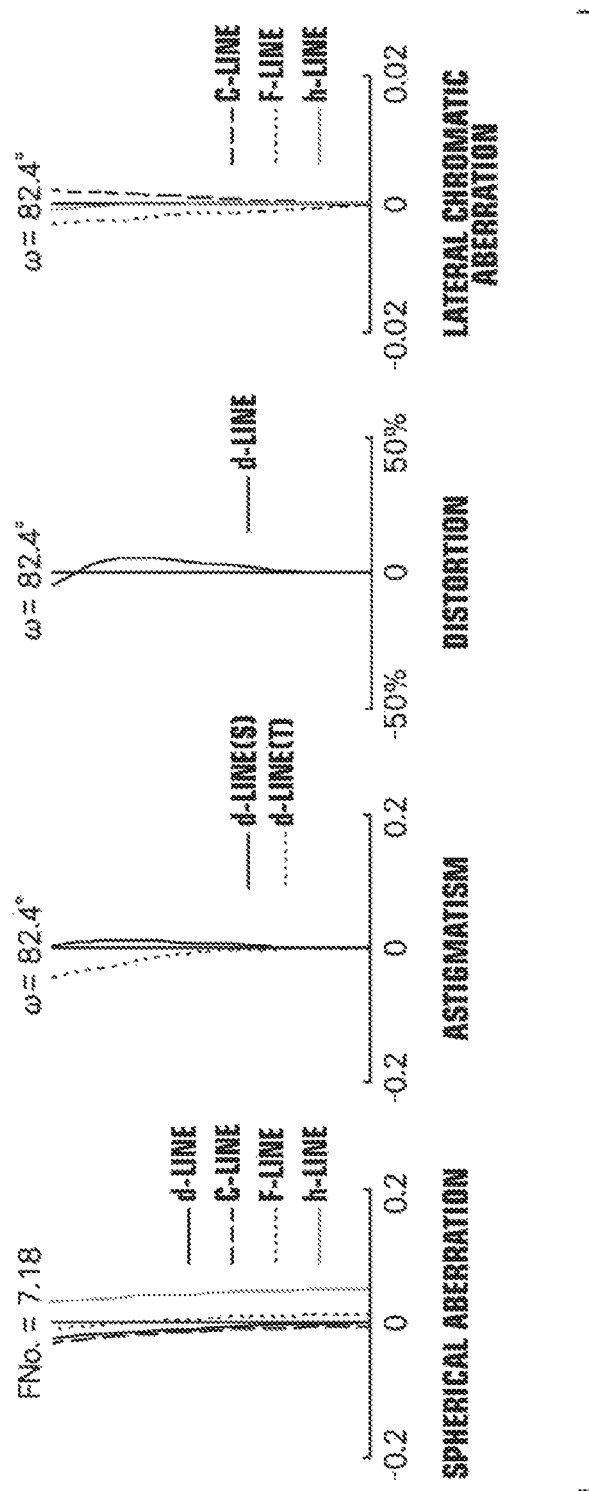
FIG. 15 is aberration diagrams of the objective lens for an endoscope in Example 1 of the present disclosure, which illustrate a spherical aberration diagram, an astigmatism diagram, a distortion diagram and a lateral chromatic aberration diagram from the left side of the sheet of paper.

FIG. 15 is aberration diagrams illustrating, in order from the left side, a spherical aberration, astigmatism, distortion, and a lateral chromatic aberration of the objective lens for an endoscope in Example 1. In the diagram of the spherical aberration, aberrations for d-line (wavelength is 587.6 nm), C-line (wavelength is 656.3 nm), F-line (wavelength is 486.1 nm) and h-line (wavelength is 404.7 nm) are indicated by a black solid line, a long broken line, a short broken line and a gray solid line, respectively. In the diagram of the astigmatism, aberrations for d-line in a sagittal direction and a tangential direction are indicated by a solid line and a short broken line, respectively, and the sign (S) and the sign (T) are written to explain the line types. In the diagram of the distortion, an aberration for d-line is indicated by a solid line. In the diagram of the lateral chromatic aberration, aberrations for C-line, F-line and h-line are indicated by a long broken line, a short broken line and a gray solid line, respectively. In the diagram of the spherical aberration, FNo. represents an F-number, and in the other aberration diagrams, ω represents a half value of the maximum full angle of view (maximum half angle of view). FIG. 15 illustrates aberrations when the object shown in the basic lens data was observed.

The method of illustration and the sign, meaning and description method of each kind of data described about Example 1 are similar also in the following examples, unless otherwise mentioned. Therefore, repetition of explanation will be omitted.

Example 2

Figure 2:
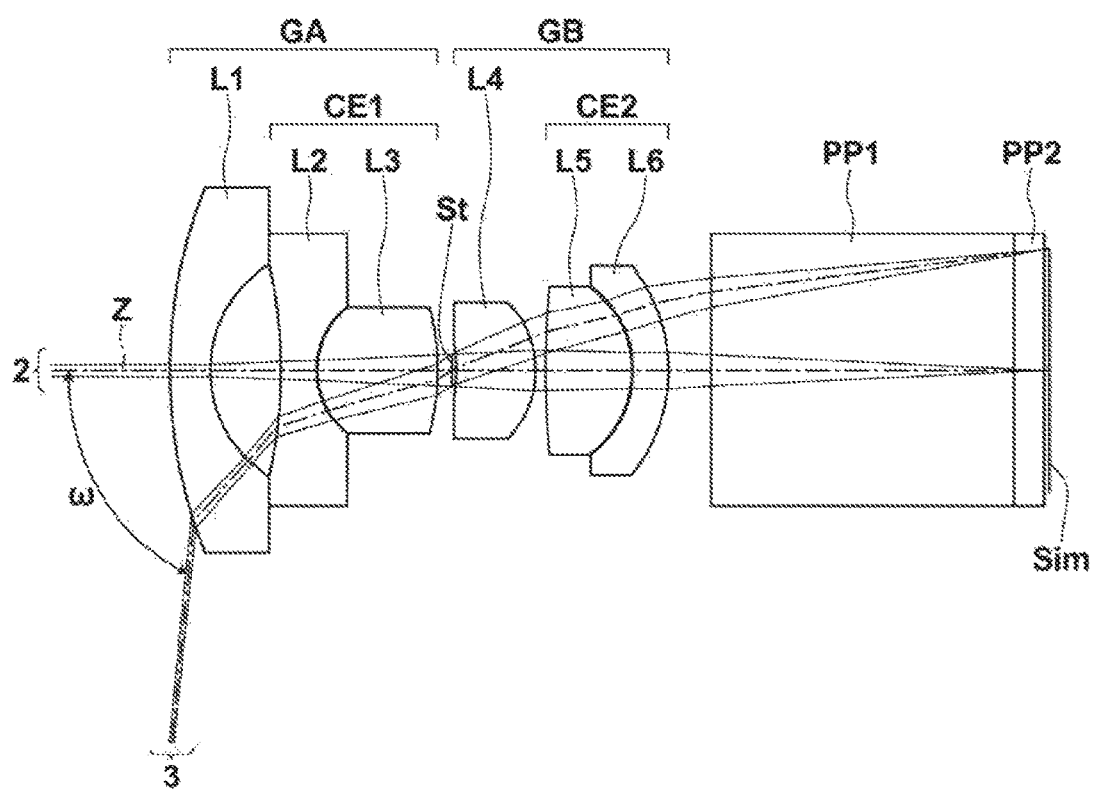
FIG. 2 is a sectional view illustrating the configuration of an objective lens for an endoscope in Example 2 of the present disclosure and optical paths.
Figure 16:
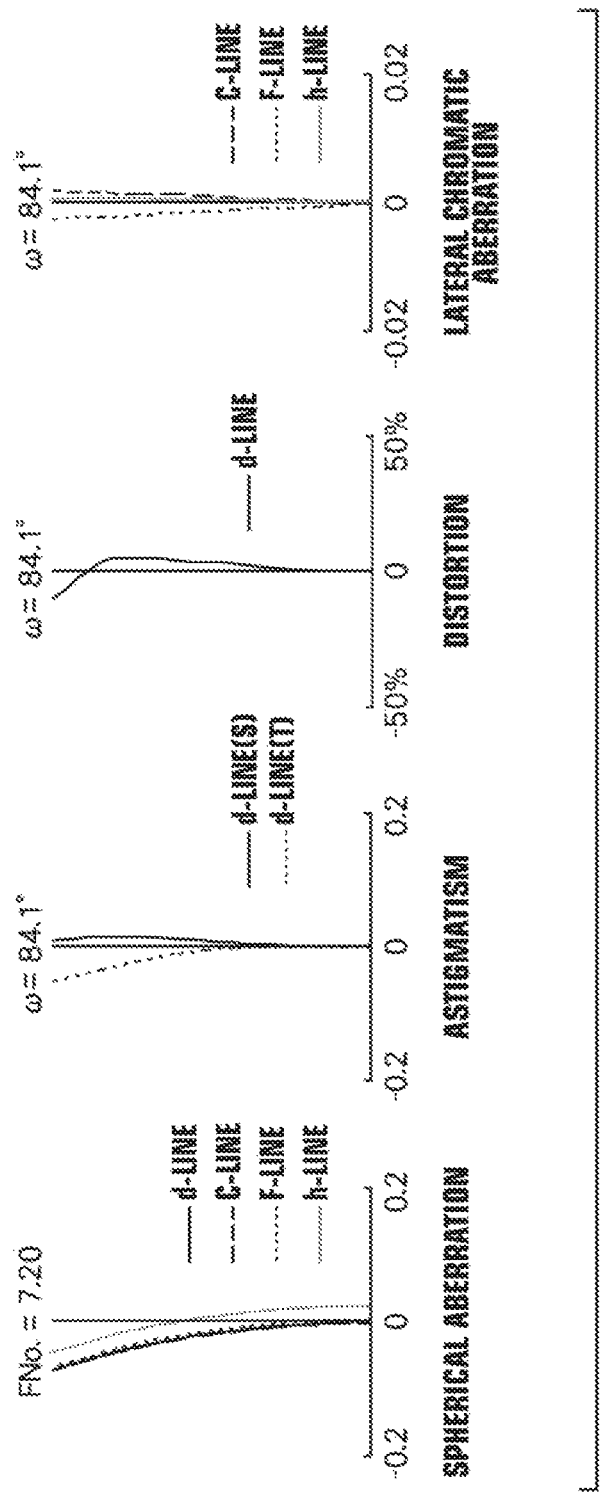
FIG. 16 is aberration diagrams of the objective lens for an endoscope in Example 2 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 2, FIG. 2 is a diagram illustrating the lens configuration and optical paths. Table 3 shows basic lens data and Table 4 shows specification. FIG. 16 illustrates aberration diagrams.

TABLE 3

| Si | Ri | Di | Ndj | vdj |
|---|---|---|---|---|
| OBJ | 12.95954 | 12.9595 | | |
| 1 | 4.93318 | 0.4320 | 1.88299 | 40.78 |
| 2 | 1.25628 | 0.7587 | | |
| 3 | −4.84600 | 0.3888 | 2.00100 | 29.13 |
| 4 | 0.80718 | 1.2860 | 1.80809 | 22.76 |
| 5 | −2.41645 | 0.1501 | | |
| 6(St) | ∞ | 0.0482 | | |
| 7 | −1.44651 | 0.8485 | 1.49700 | 81.54 |
| 8 | −0.97616 | 0.1080 | | |
| 9 | 7.84607 | 0.9380 | 1.49700 | 81.54 |
| 10 | −1.05252 | 0.3780 | 1.92286 | 18.90 |
| 11 | −1.67437 | 0.4553 | | |
| 12 | ∞ | 3.2399 | 1.55920 | 53.92 |
| 13 | ∞ | 0.3240 | 1.51633 | 64.05 |
| 14 | ∞ | 0.0540 | | |
| IMG | ∞ | | | |

TABLE 4

| f | 1.000 |
|---|---|
| Bf | 2.729 |
| FNo. | 7.20 |
| 2ω[°] | 168.2 |

Example 3

Figure 3:
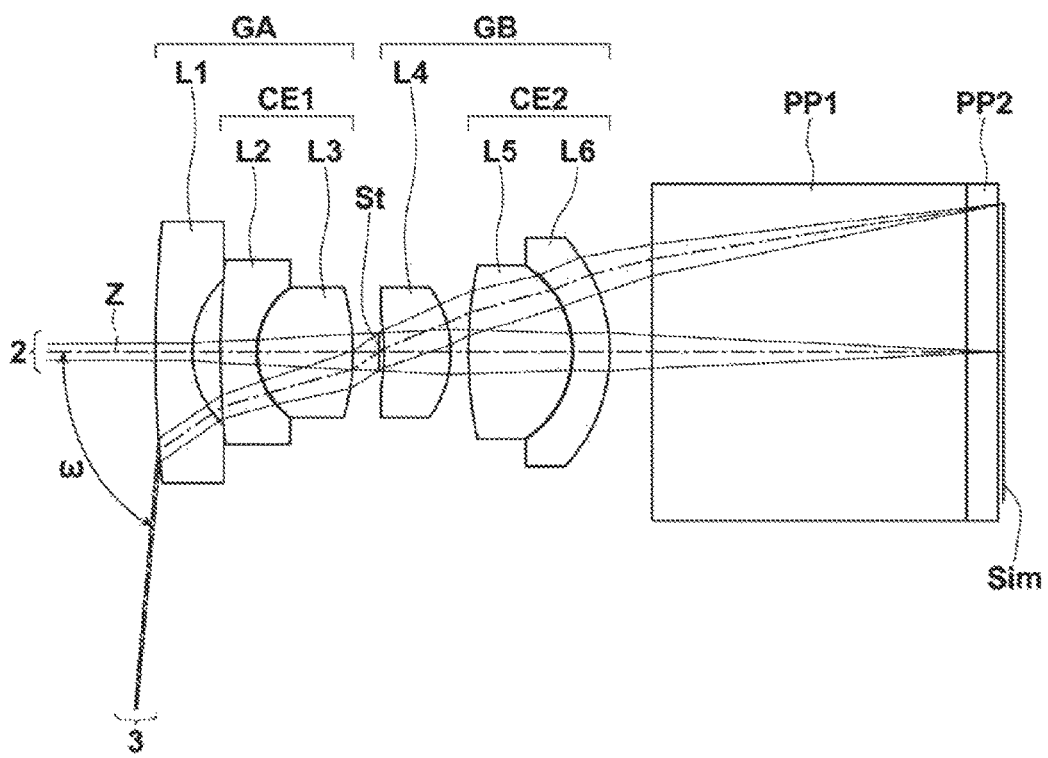
FIG. 3 is a sectional view illustrating the configuration of an objective lens for an endoscope in Example 3 of the present disclosure and optical paths.
Figure 17:
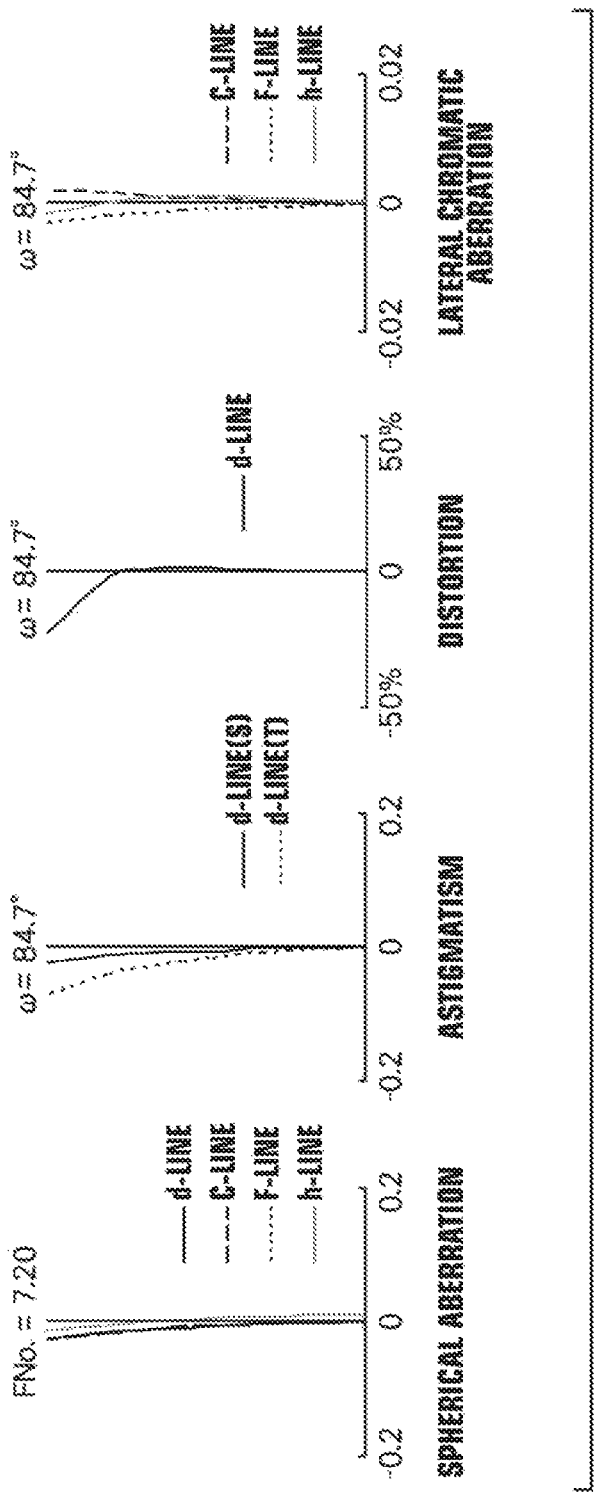
FIG. 17 is aberration diagrams of the objective lens for an endoscope in Example 3 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 3, FIG. 3 is a diagram illustrating the lens configuration and optical paths. Table 5 shows basic lens data and Table 6 shows specification. FIG. 17 illustrates aberration diagrams.

TABLE 5

| Si | Ri | Di | Ndj | vdj |
|---|---|---|---|---|
| OBJ | 10.30701 | 10.3070 | | |
| 1 | 10.16336 | 0.3006 | 2.00100 | 29.13 |
| 2 | 0.78286 | 0.2280 | | |
| 3 | 5.86882 | 0.3092 | 2.00100 | 29.13 |
| 4 | 0.62309 | 0.7791 | 1.80809 | 22.76 |
| 5 | −1.78019 | 0.2121 | | |
| 6(St) | ∞ | 0.0419 | | |
| 7 | −1.66756 | 0.5442 | 1.49700 | 81.54 |
| 8 | −0.84767 | 0.1445 | | |
| 9 | 3.18874 | 0.8619 | 1.43875 | 94.94 |
| 10 | −0.80330 | 0.3006 | 1.92286 | 18.90 |
| 11 | −1.28981 | 0.3428 | | |
| 12 | ∞ | 2.5768 | 1.55920 | 53.92 |
| 13 | ∞ | 0.2577 | 1.51633 | 64.05 |
| 14 | ∞ | 0.0428 | | |
| IMG | ∞ | | | |

Example 3

TABLE 6

| f | 1.000 |
|---|---|
| Bf | 2.115 |
| FNo. | 7.20 |
| 2ω[°] | 169.4 |

Example 4

Figure 4:
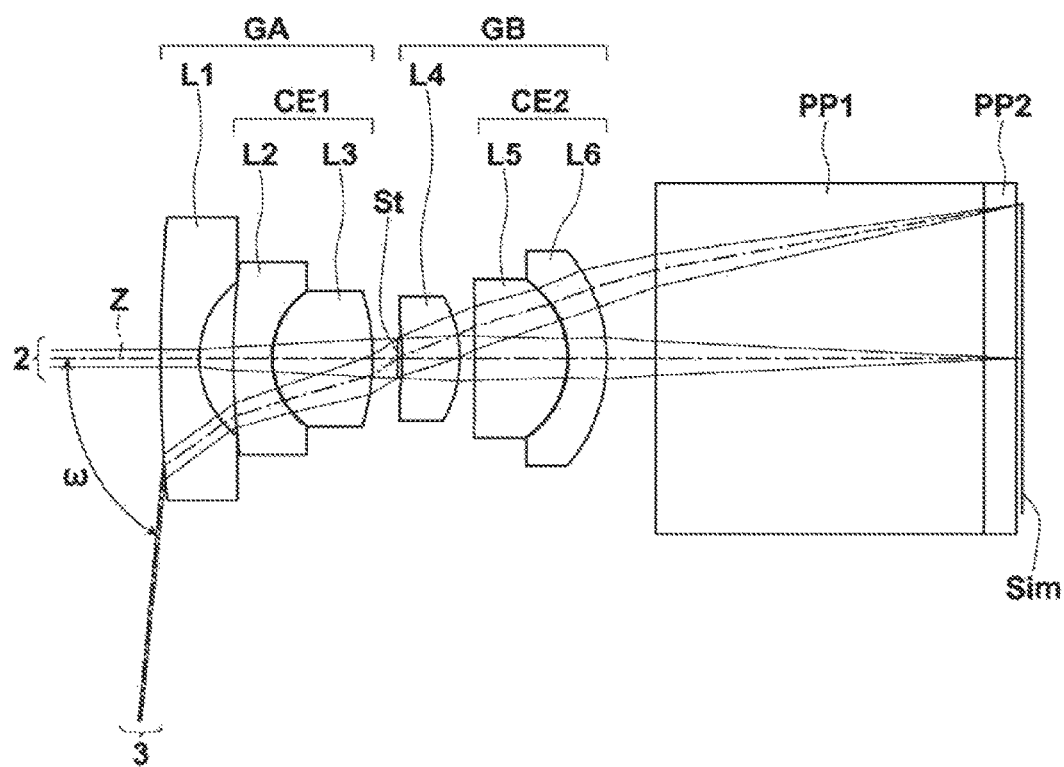
FIG. 4 is a sectional view illustrating the configuration of an objective lens for an endoscope in Example 4 of the present disclosure and optical paths.
Figure 18:
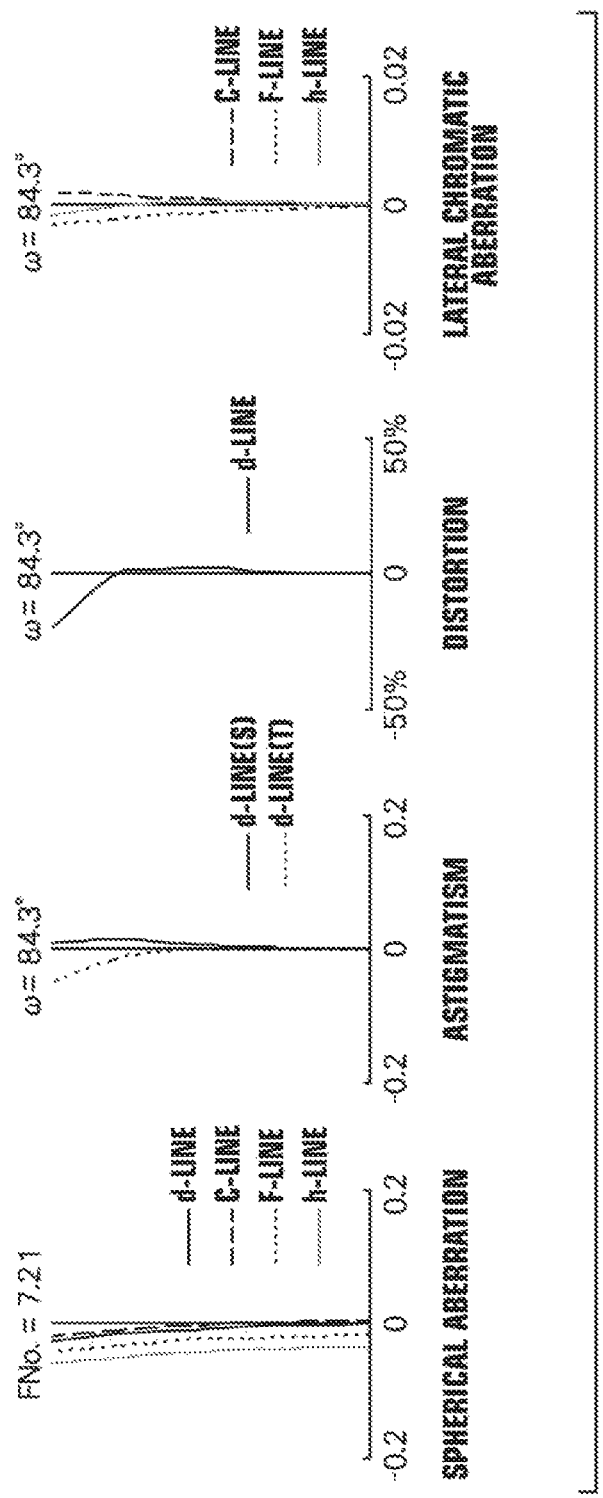
FIG. 18 is aberration diagrams of the objective lens for an endoscope in Example 4 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 4, FIG. 4 is a diagram illustrating the lens configuration and optical paths. Table 7 shows basic lens data and Table 8 shows specification. FIG. 18 illustrates aberration diagrams.

TABLE 7

| Si | Ri | Di | Ndj | vdj |
|---|---|---|---|---|
| OBJ | 10.37765 | 10.3776 | | |
| 1 | 12.40958 | 0.3027 | 1.88300 | 40.81 |
| 2 | 0.72176 | 0.2736 | | |
| 3 | 5.40546 | 0.3113 | 1.88300 | 40.81 |
| 4 | 0.62582 | 0.7883 | 1.72825 | 28.46 |
| 5 | −1.67824 | 0.1977 | | |
| 6(St) | ∞ | 0.0333 | | |
| 7 | −2.10250 | 0.4561 | 1.59522 | 67.73 |
| 8 | −0.92985 | 0.1169 | | |
| 9 | −61.01583 | 0.7478 | 1.49700 | 81.54 |
| 10 | −0.71700 | 0.3027 | 1.84666 | 23.78 |
| 11 | −1.23436 | 0.3863 | | |
| 12 | ∞ | 2.5944 | 1.55920 | 53.92 |
| 13 | ∞ | 0.2594 | 1.51633 | 64.05 |
| 14 | ∞ | 0.0435 | | |
| IMG | ∞ | | | |

TABLE 8

| f | 1.000 |
|---|---|
| Bf | 2.172 |
| FNo. | 7.21 |
| 2ω[°] | 168.6 |

Example 5

Figure 5:
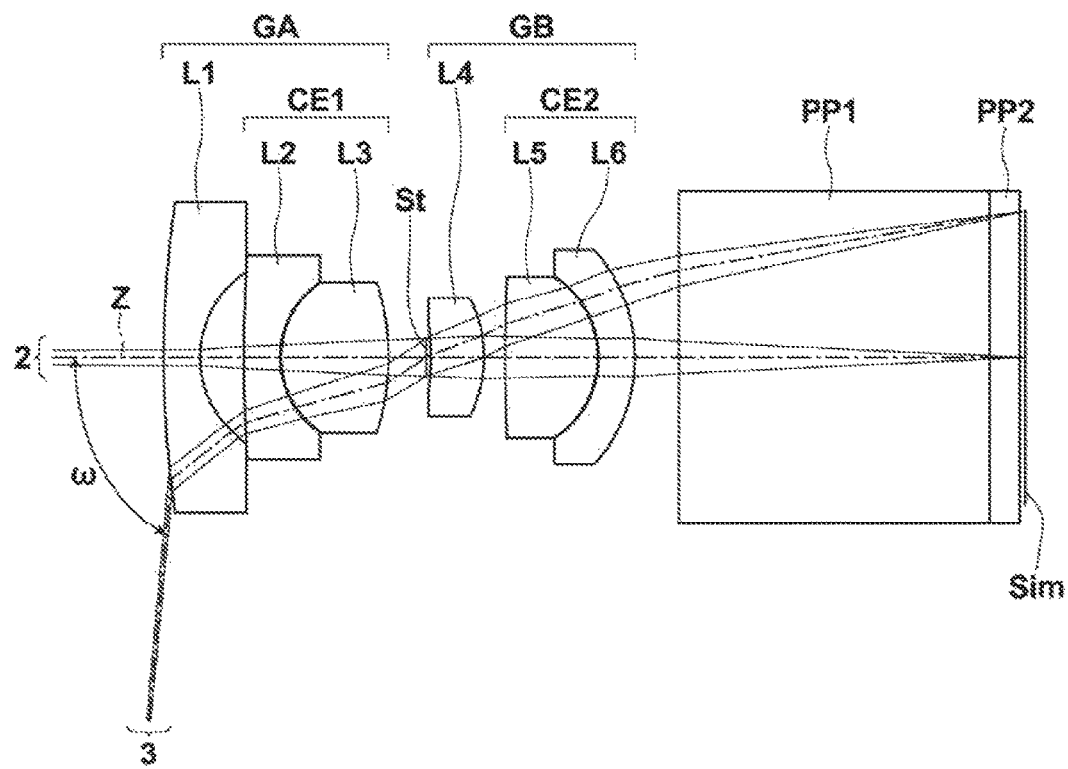
FIG. 5 is a sectional view illustrating the configuration of an objective lens for an endoscope in Example 5 of the present disclosure and optical paths.
Figure 19:
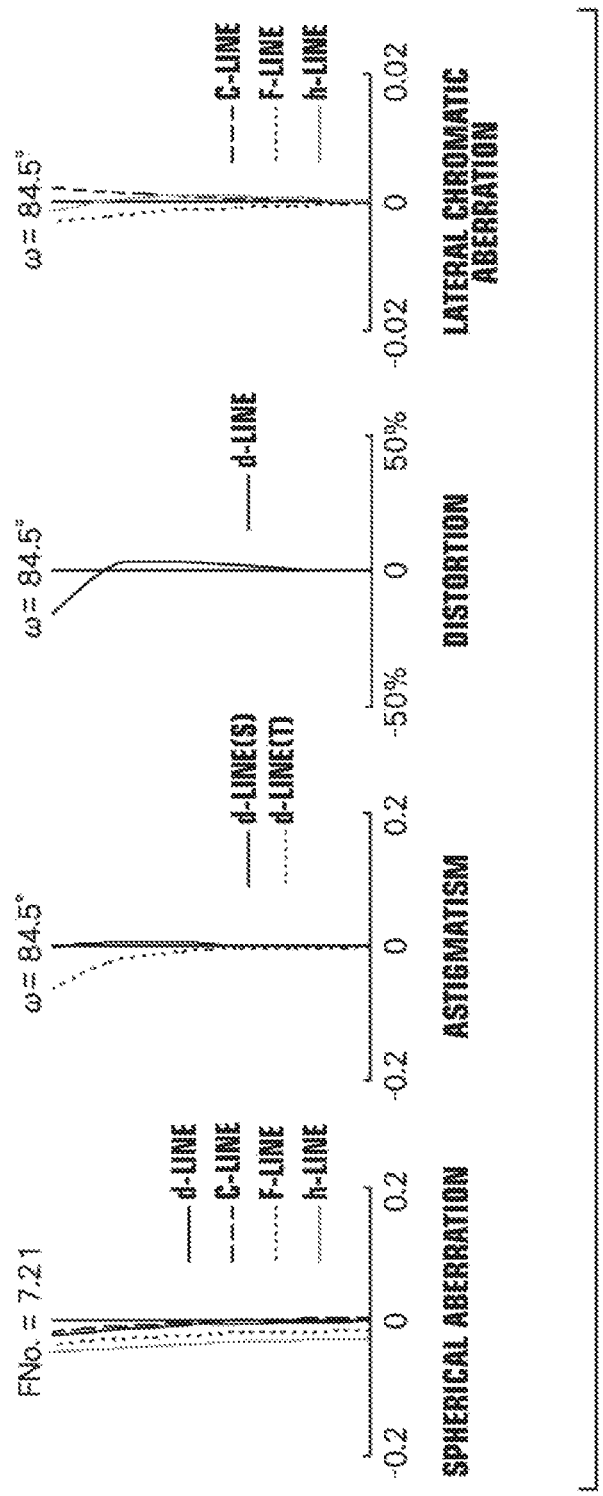
FIG. 19 is aberration diagrams of the objective lens for an endoscope in Example 5 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 5, FIG. 5 is a diagram illustrating the lens configuration and optical paths. Table 9 shows basic lens data and Table 10 shows specification. FIG. 19 illustrates aberration diagrams.

TABLE 9

| Si | Ri | Di | Ndj | vdj |
|---|---|---|---|---|
| OBJ | 10.76065 | 10.7607 | | |
| 1 | 8.67126 | 0.3139 | 1.88300 | 40.81 |
| 2 | 0.82872 | 0.3841 | | |
| 3 | 11.74547 | 0.3229 | 1.88300 | 40.81 |
| 4 | 0.74236 | 0.9297 | 1.72825 | 28.46 |
| 5 | −1.97436 | 0.3299 | | |
| 6(St) | ∞ | 0.0355 | | |
| 7 | −2.23866 | 0.4605 | 1.59522 | 67.73 |
| 8 | −1.07802 | 0.1836 | | |
| 9 | 11.84161 | 0.8172 | 1.49700 | 81.54 |
| 10 | −0.78152 | 0.3139 | 1.84666 | 23.78 |
| 11 | −1.31797 | 0.3803 | | |
| 12 | ∞ | 2.6902 | 1.55920 | 53.92 |
| 13 | ∞ | 0.2690 | 1.51633 | 64.05 |
| 14 | ∞ | 0.0448 | | |
| IMG | ∞ | | | |

TABLE 10

| | |
|---|---|
| f | 1.000 |
| Bf | 2.240 |
| FNo. | 7.21 |
| 2ω[°] | 169.0 |

Example 6

Figure 6:
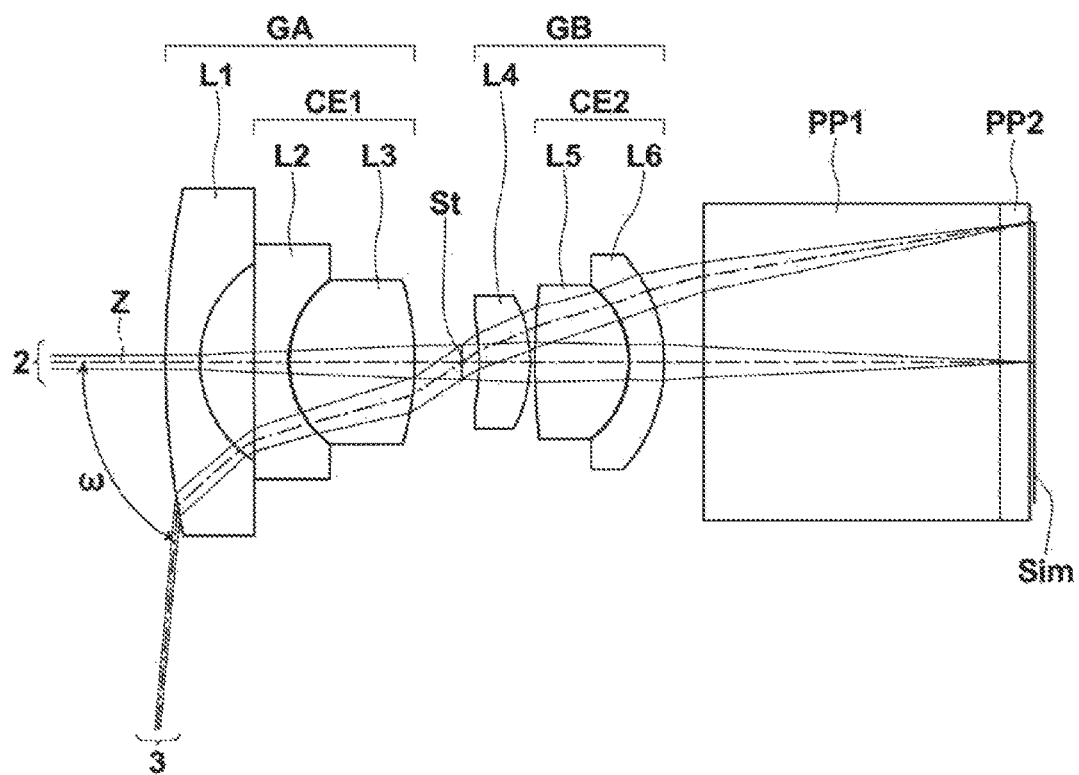
FIG. 6 is a sectional view illustrating the configuration of an objective lens for an endoscope in Example 6 of the present disclosure and optical paths.
Figure 20:
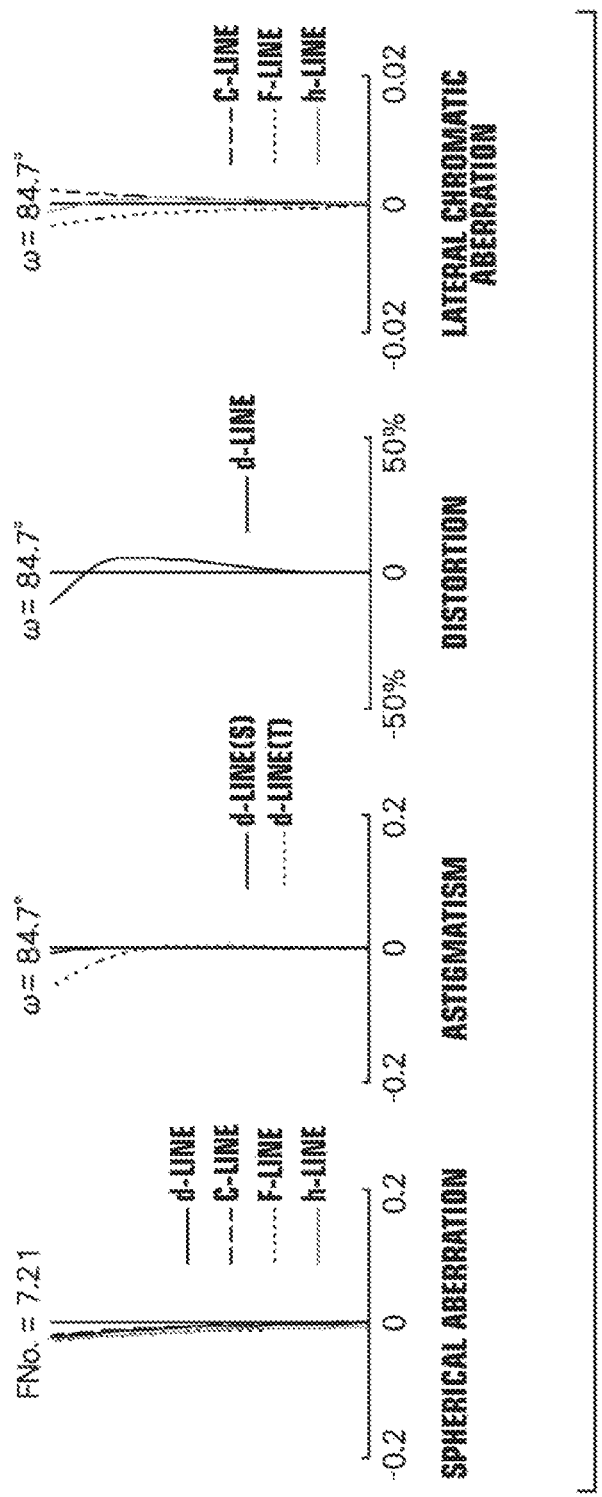
FIG. 20 is aberration diagrams of the objective lens for an endoscope in Example 6 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 6, FIG. 6 is a diagram illustrating the lens configuration and optical paths. Table 11 shows basic lens data and Table 12 shows specification. FIG. 20 illustrates aberration diagrams.

TABLE 11

| Si | Ri | Di | Ndj | vdj |
|---|---|---|---|---|
| OBJ | 11.20323 | 11.2032 | | |
| 1 | 7.49812 | 0.3268 | 1.88300 | 40.81 |
| 2 | 1.04335 | 0.5129 | | |
| 3 | 94.28372 | 0.3361 | 1.88300 | 40.81 |
| 4 | 0.91060 | 1.1852 | 1.72825 | 28.46 |
| 5 | −2.42372 | 0.4433 | | |
| 6(St) | ∞ | 0.1642 | | |
| 7 | −2.18569 | 0.4890 | 1.59522 | 67.73 |
| 8 | −1.20523 | 0.0467 | | |
| 9 | 6.23200 | 0.8936 | 1.49700 | 81.54 |
| 10 | −0.85474 | 0.3268 | 1.84666 | 23.78 |
| 11 | −1.43175 | 0.3749 | | |
| 12 | ∞ | 2.8008 | 1.55920 | 53.92 |
| 13 | ∞ | 0.2801 | 1.51633 | 64.05 |
| 14 | ∞ | 0.0467 | | |
| IMG | ∞ | | | |

TABLE 12

| | |
|---|---|
| f | 1.000 |
| Bf | 2.319 |
| FNo. | 7.21 |
| 2ω[°] | 169.4 |

Example 7

Figure 7:
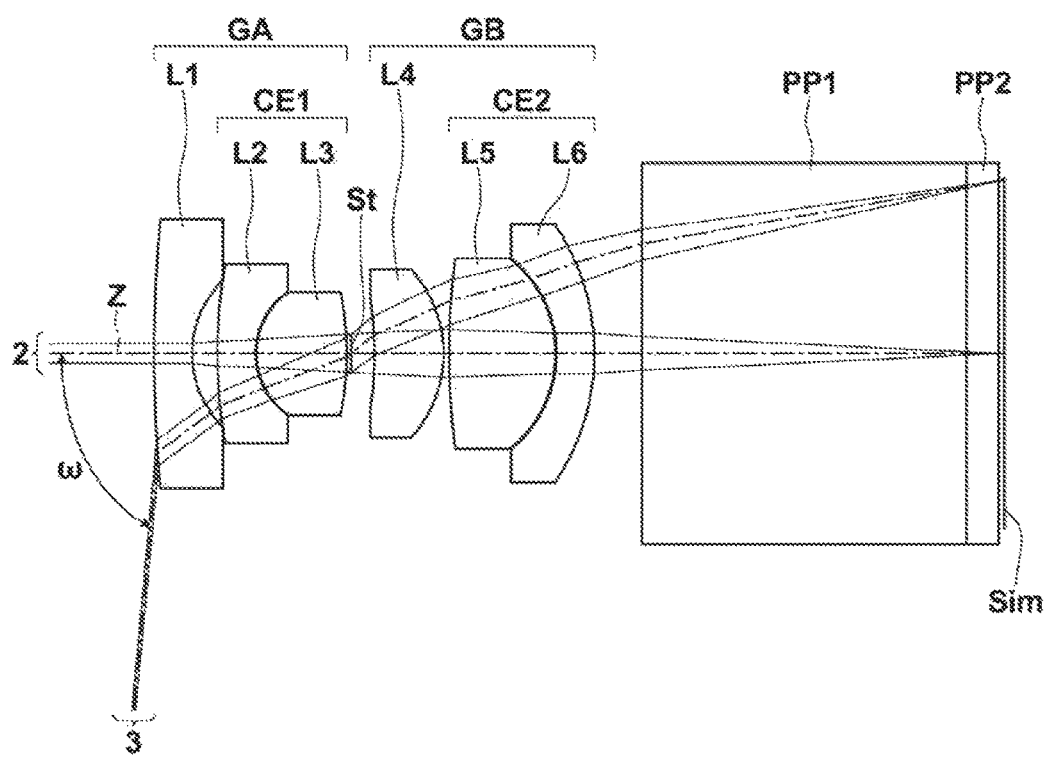
FIG. 7 is a sectional view illustrating the configuration of an objective lens for an endoscope in Example 7 of the present disclosure and optical paths.
Figure 21:
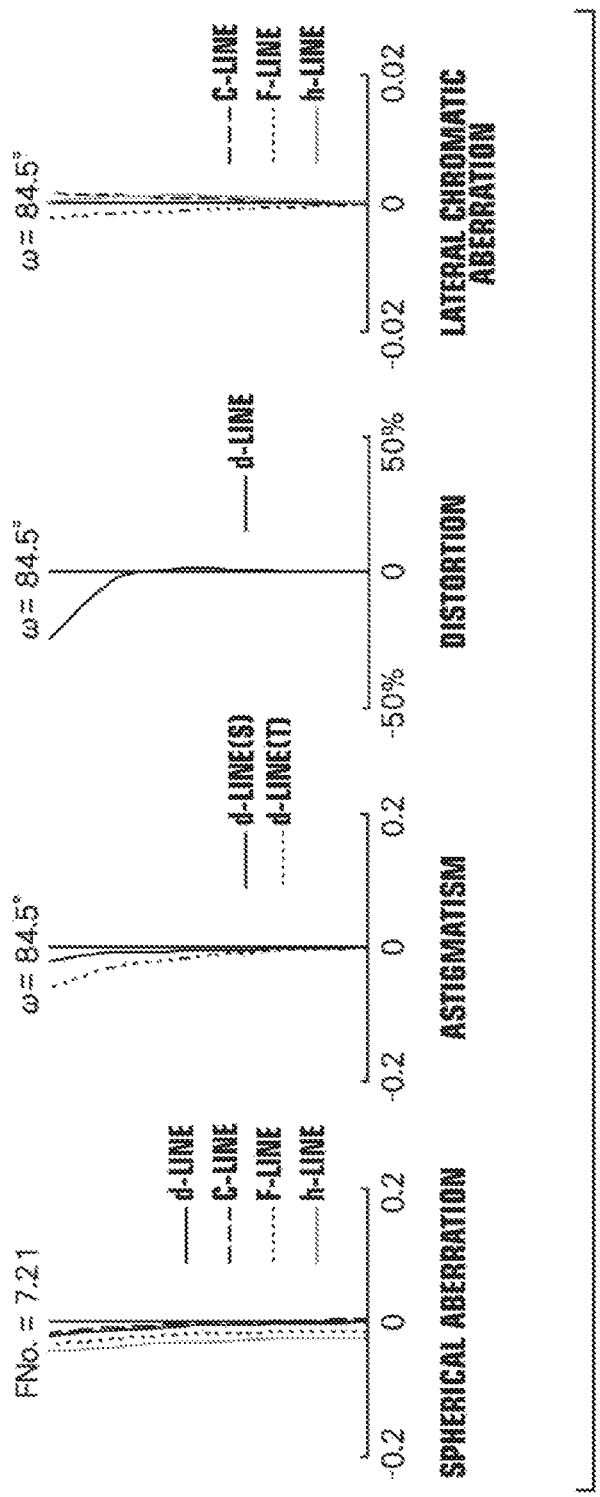
FIG. 21 is aberration diagrams of the objective lens for an endoscope in Example 7 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 7, FIG. 7 is a diagram illustrating the lens configuration and optical paths. Table 13 shows basic lens data and Table 14 shows specification. FIG. 21 illustrates aberration diagrams.

TABLE 13

| Si | Ri | Di | Ndj | vdj |
|---|---|---|---|---|
| OBJ | 9.14713 | 9.1471 | | |
| 1 | 9.38633 | 0.2668 | 1.88300 | 40.81 |
| 2 | 0.67648 | 0.1827 | | |
| 3 | 3.40082 | 0.2744 | 1.88300 | 40.81 |
| 4 | 0.49923 | 0.6343 | 1.72825 | 28.46 |
| 5 | −2.05112 | 0.0310 | | |
| 6(St) | ∞ | 0.1651 | | |
| 7 | −2.40400 | 0.4861 | 1.59522 | 67.73 |
| 8 | −0.82194 | 0.0381 | | |
| 9 | 4.83668 | 0.7617 | 1.49700 | 81.54 |
| 10 | −0.81560 | 0.2668 | 1.84666 | 23.78 |
| 11 | −1.52334 | 0.3342 | | |
| 12 | ∞ | 2.2868 | 1.55920 | 53.92 |
| 13 | ∞ | 0.2287 | 1.51633 | 64.05 |
| 14 | ∞ | 0.0381 | | |
| IMG | ∞ | | | |

TABLE 14

| | |
|---|---|
| f | 1.000 |
| Bf | 1.884 |
| FNo. | 7.21 |
| 2ω [°] | 169.0 |

Example 8

Figure 8:
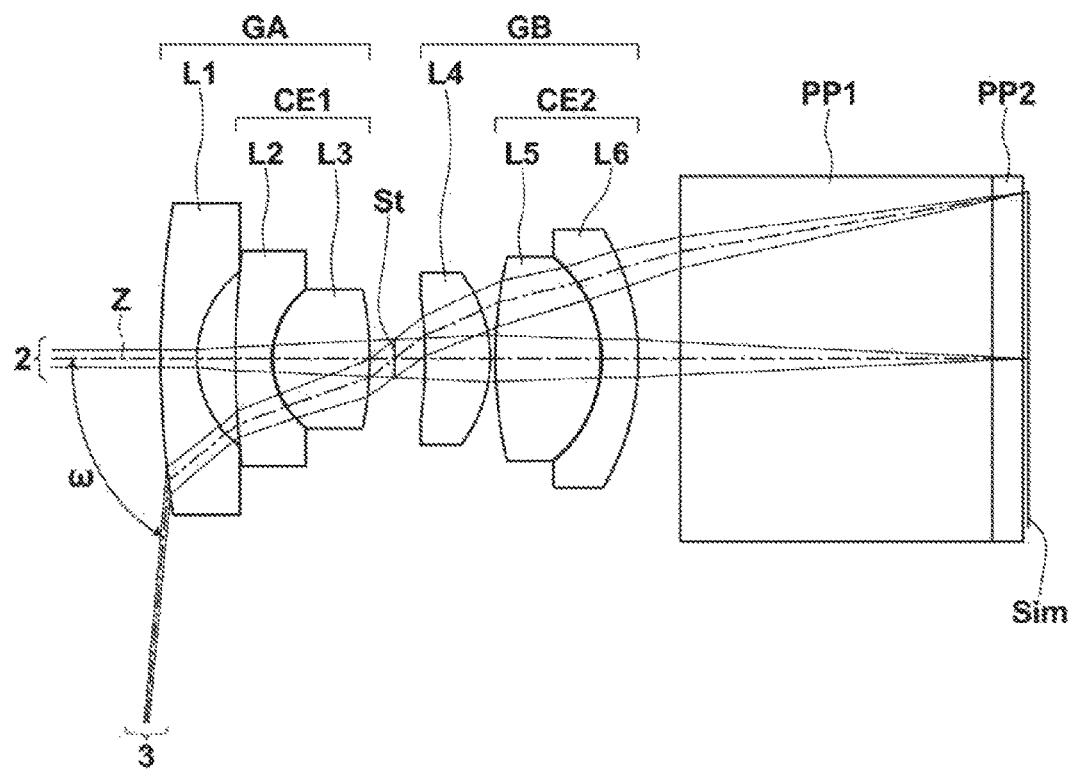
FIG. 8 is a sectional view illustrating the configuration of an objective lens for an endoscope in Example 8 of the present disclosure and optical paths.
Figure 22:
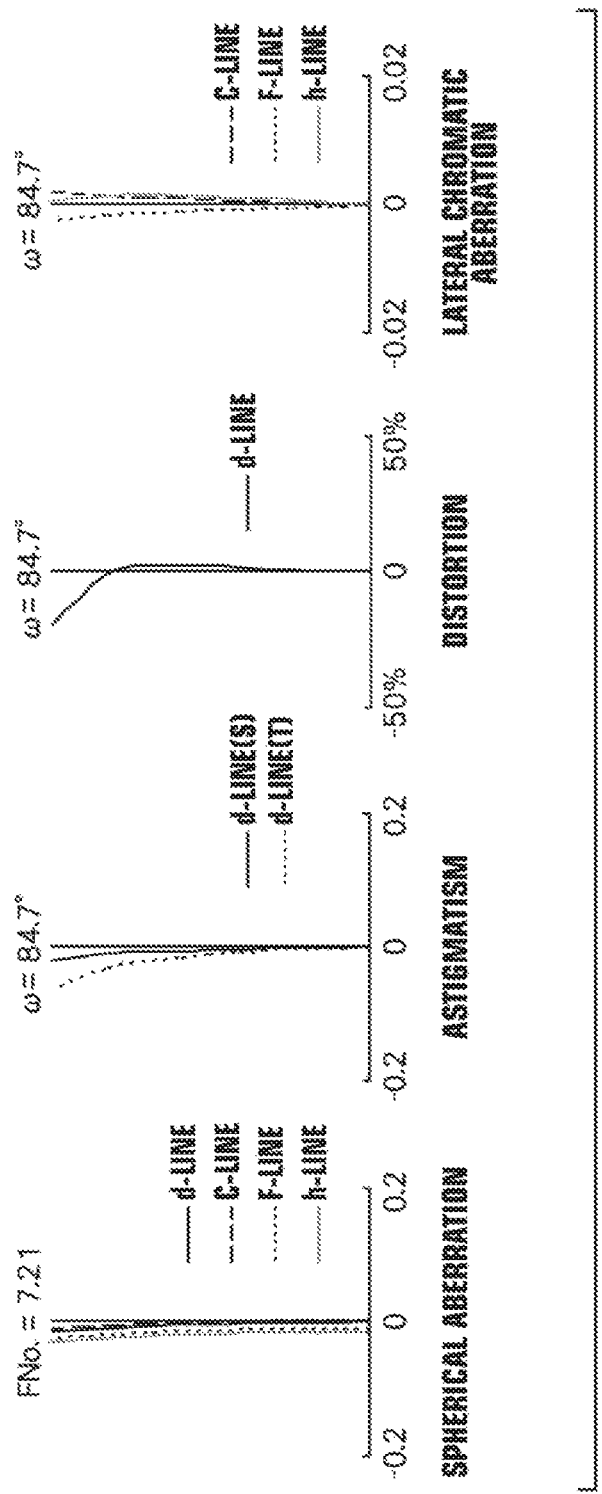
FIG. 22 is aberration diagrams of the objective lens for an endoscope in Example 8 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 8, FIG. 8 is a diagram illustrating the lens configuration and optical paths. Table 15 shows basic lens data and Table 16 shows specification. FIG. 22 illustrates aberration diagrams.

TABLE 15

| Si | Ri | Di | Ndj | vdj |
|---|---|---|---|---|
| OBJ | 9.46913 | 9.4691 | | |
| 1 | 7.00214 | 0.2762 | 1.88300 | 40.81 |
| 2 | 0.79821 | 0.2941 | | |
| 3 | 6.42842 | 0.2841 | 1.88300 | 40.81 |
| 4 | 0.63982 | 0.7340 | 1.72825 | 28.46 |
| 5 | −2.46212 | 0.1885 | | |
| 6 (St) | ∞ | 0.2315 | | |
| 7 | −2.95463 | 0.4944 | 1.59522 | 67.73 |
| 8 | −1.00282 | 0.0395 | | |
| 9 | 3.17218 | 0.8148 | 1.49700 | 81.54 |
| 10 | −0.94863 | 0.2762 | 1.84666 | 23.78 |
| 11 | −1.80747 | 0.3204 | | |
| 12 | ∞ | 2.3673 | 1.55920 | 53.92 |
| 13 | ∞ | 0.2367 | 1.51633 | 64.05 |
| 14 | ∞ | 0.0394 | | |
| IMG | ∞ | | | |

TABLE 16

| | |
|---|---|
| f | 1.000 |
| Bf | 1.933 |
| FNo. | 7.21 |
| 2ω [°] | 169.4 |

Example 9

Figure 9:
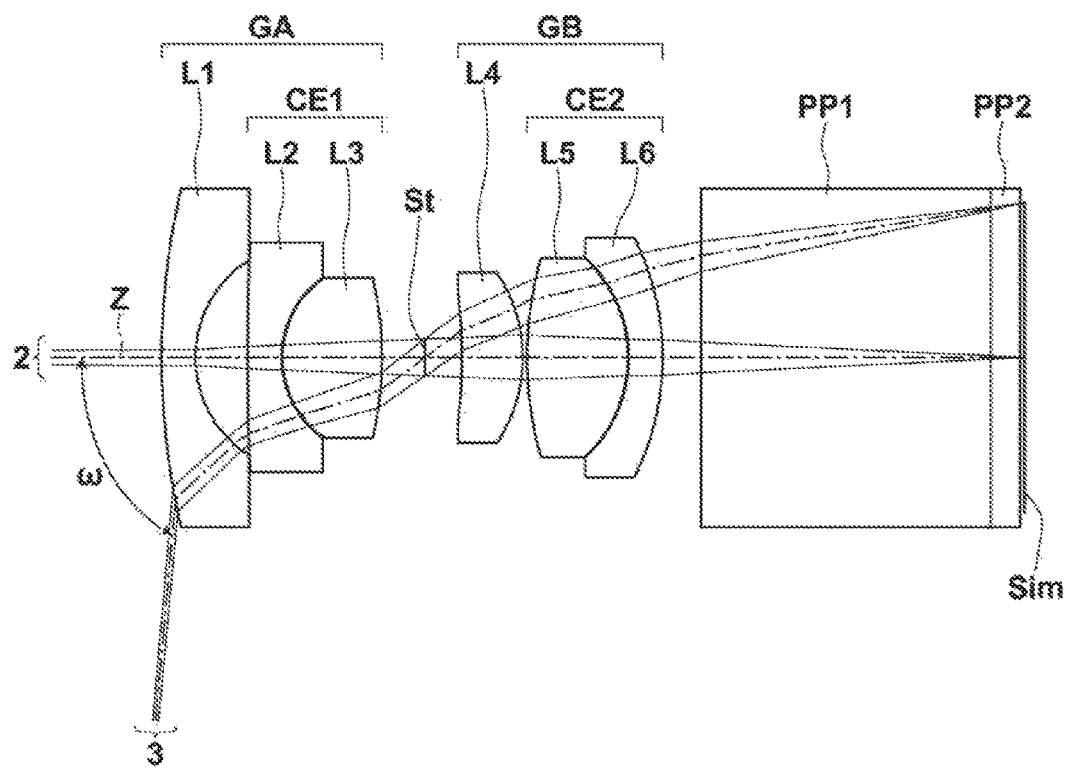
FIG. 9 is a sectional view illustrating the configuration of an objective lens for an endoscope in Example 9 of the present disclosure and optical paths.
Figure 23:
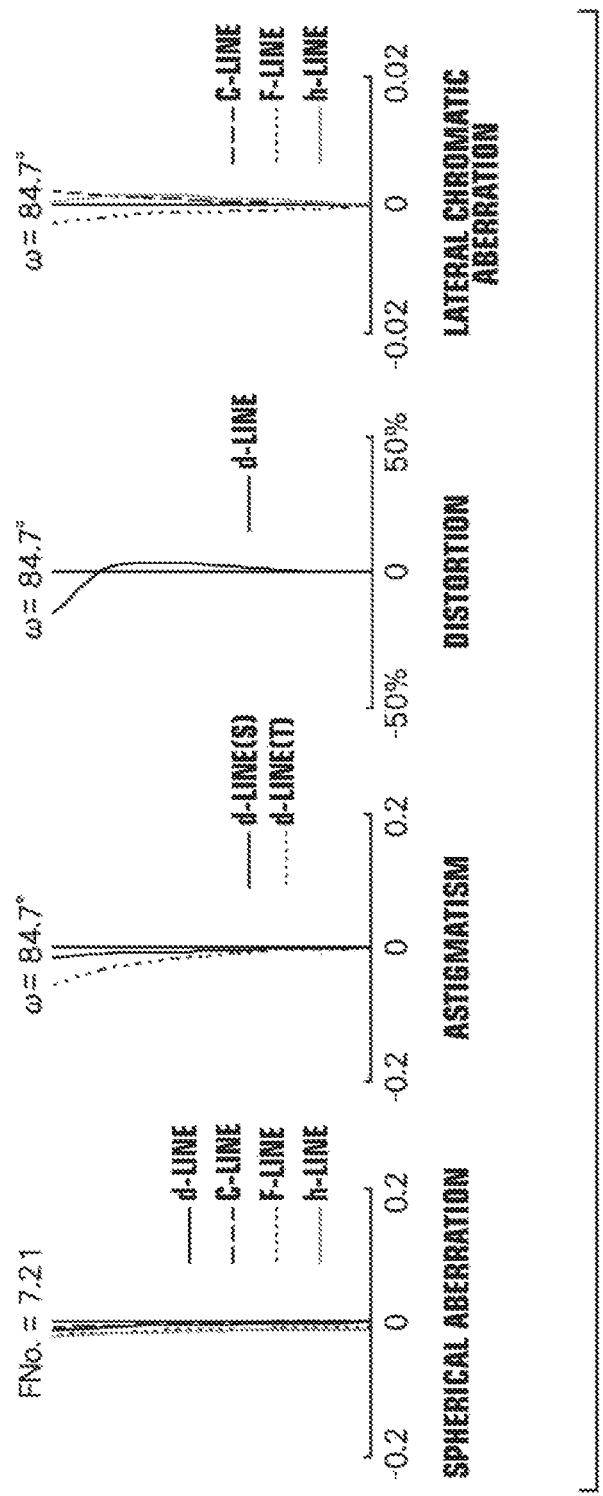
FIG. 23 is aberration diagrams of the objective lens for an endoscope in Example 9 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 9, FIG. 9 is a diagram illustrating the lens configuration and optical paths. Table 17 shows basic lens data and Table 18 shows specification. FIG. 23 illustrates aberration diagrams.

TABLE 17

| Si | Ri | Di | Ndj | vdj |
|---|---|---|---|---|
| OBJ | 9.82503 | 9.8250 | | |
| 1 | 5.84081 | 0.2866 | 1.88300 | 40.81 |
| 2 | 0.92686 | 0.4477 | | |
| 3 | 23.21772 | 0.2948 | 1.88300 | 40.81 |
| 4 | 0.78810 | 0.8424 | 1.72825 | 28.46 |
| 5 | −2.81603 | 0.3648 | | |
| 6 (St) | ∞ | 0.3124 | | |
| 7 | −4.19182 | 0.5179 | 1.59522 | 67.73 |
| 8 | −1.21056 | 0.0409 | | |
| 9 | 2.89578 | 0.8617 | 1.49700 | 81.54 |
| 10 | −1.09039 | 0.2866 | 1.84666 | 23.78 |
| 11 | −2.13160 | 0.3281 | | |
| 12 | ∞ | 2.4563 | 1.55920 | 53.92 |
| 13 | ∞ | 0.2456 | 1.51633 | 64.05 |
| 14 | ∞ | 0.0410 | | |
| IMG | ∞ | | | |

TABLE 18

| f | 1.000 |
|---|---|
| Bf | 2.011 |
| FNo. | 7.21 |
| 2ω [°] | 169.4 |

Example 10

Figure 10:
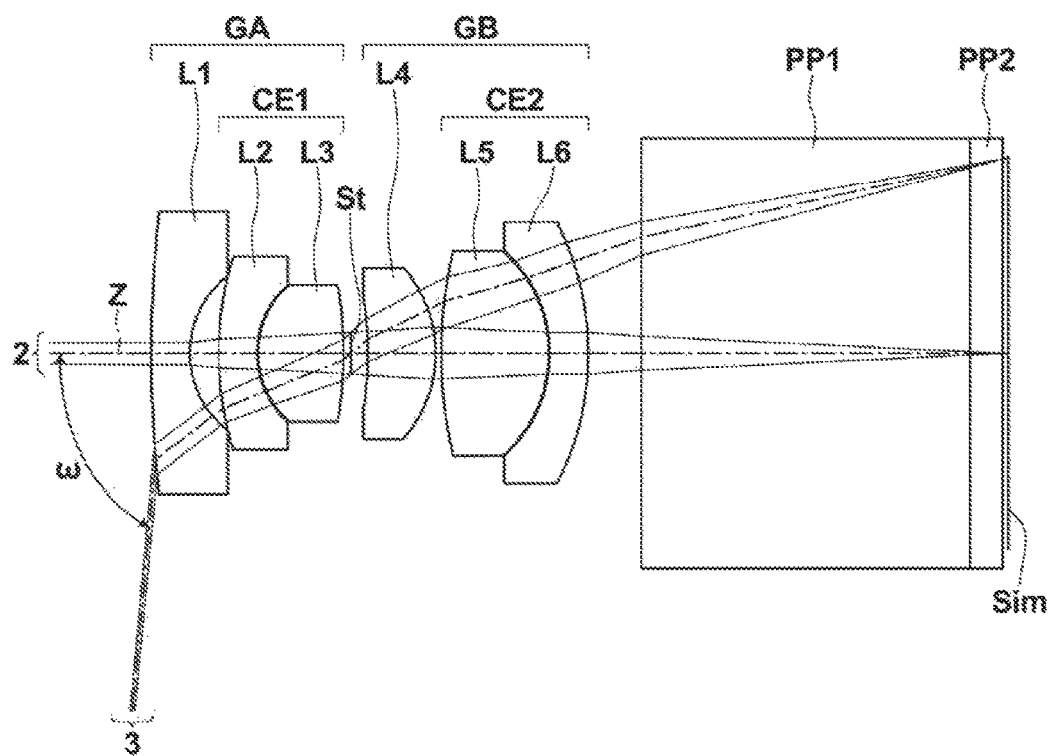
FIG. 10 is a sectional view illustrating the configuration of an objective lens for an endoscope in Example 10 of the present disclosure and optical paths.
Figure 24:
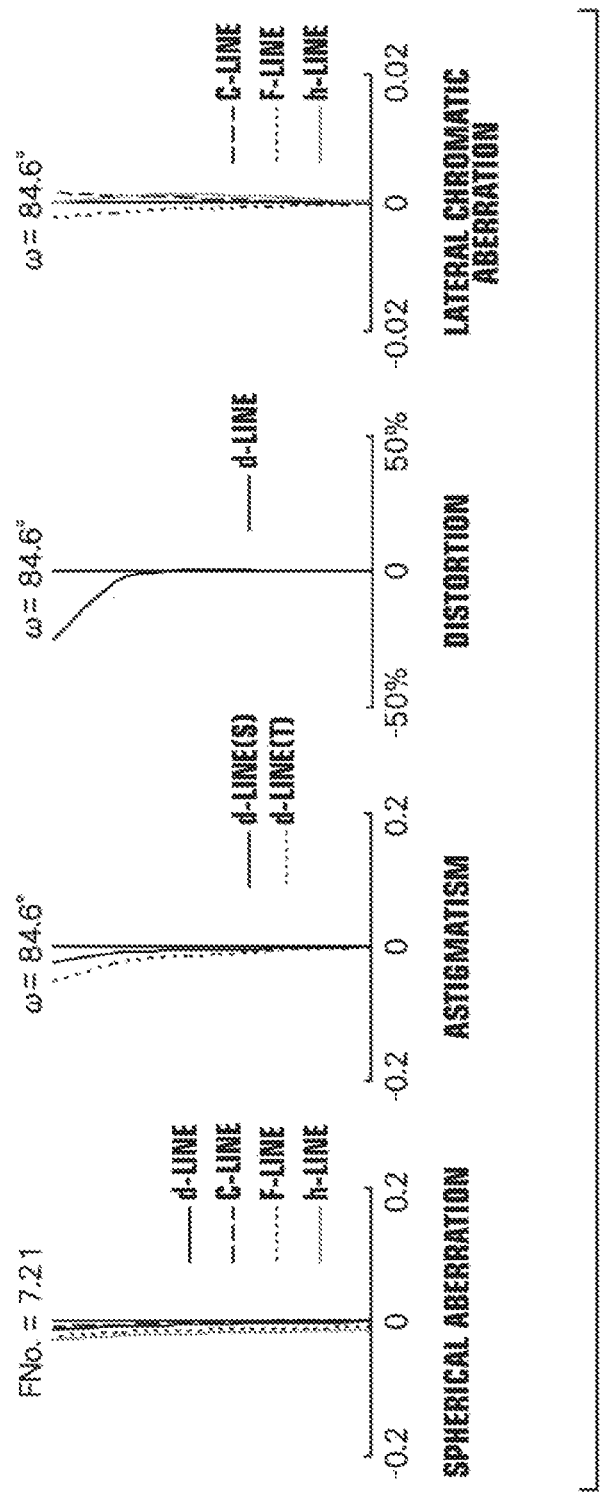
FIG. 24 is aberration diagrams of the objective lens for an endoscope in Example 10 of the present disclosure, which illustrate a spherical aberration diagram, an astigmatism diagram, a distortion diagram and, a lateral chromatic aberration diagram from the left side of the sheet of paper.

Regarding an objective lens for an endoscope in Example 10, FIG. 10 is a diagram illustrating the lens configuration and optical paths. Table 19 shows basic lens data and Table 20 shows specification. FIG. 24 illustrates aberration diagrams.

TABLE 19

| Si | Ri | Di | Ndj | vdj |
|---|---|---|---|---|
| OBJ | 8.26430 | 8.2643 | | |
| 1 | 7.57688 | 0.2410 | 1.88300 | 40.81 |
| 2 | 0.57441 | 0.1841 | | |
| 3 | 1.88369 | 0.2479 | 1.88300 | 40.81 |
| 4 | 0.53965 | 0.5353 | 1.72825 | 28.46 |
| 5 | −2.45729 | 0.0484 | | |
| 6 (St) | ∞ | 0.1045 | | |
| 7 | −2.07942 | 0.4263 | 1.59522 | 67.73 |
| 8 | −0.75795 | 0.0344 | | |
| 9 | 2.57593 | 0.6869 | 1.49700 | 81.54 |
| 10 | −0.80693 | 0.2410 | 1.84666 | 23.78 |
| 11 | −1.68950 | 0.3329 | | |
| 12 | ∞ | 2.0661 | 1.55920 | 53.92 |
| 13 | ∞ | 0.2066 | 1.51633 | 64.05 |
| 14 | ∞ | 0.0343 | | |
| IMG | ∞ | | | |

TABLE 20

| f | 1.000 |
|---|---|
| Bf | 1.710 |
| FNo. | 7.21 |
| 2ω [°] | 169.2 |

Example 11

Figure 11:
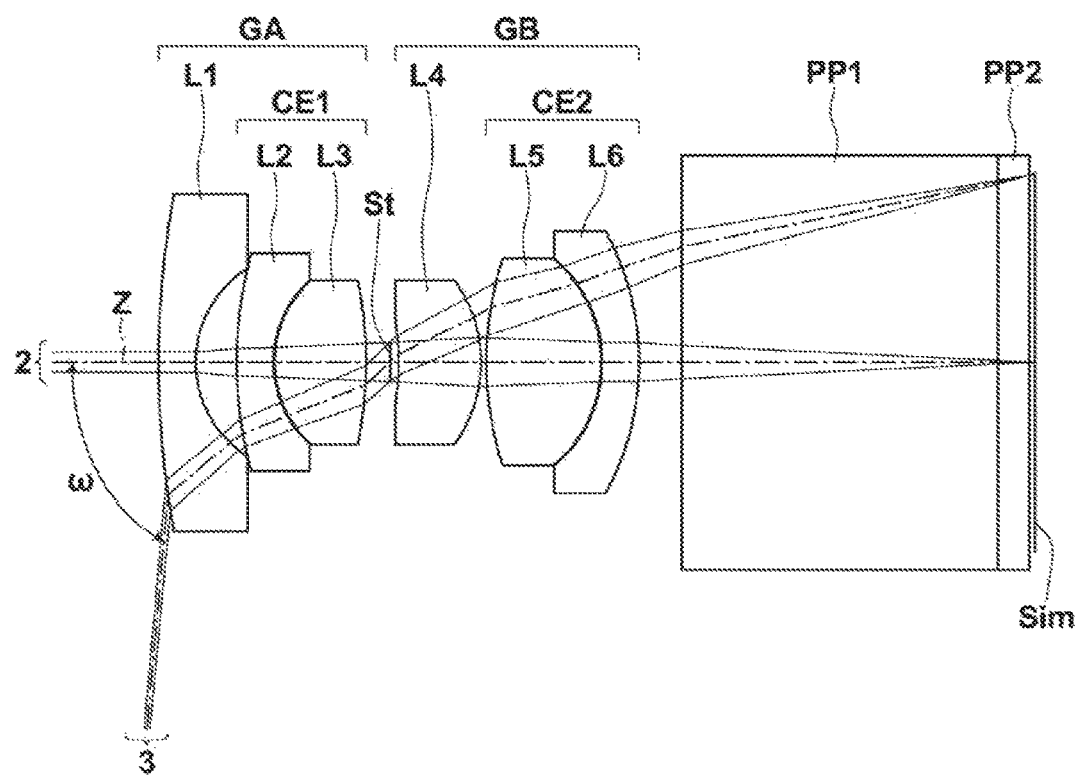
FIG. 11 is a sectional view illustrating the configuration of an objective lens for an endoscope in Example 11 of the present disclosure and optical paths.
Figure 25:
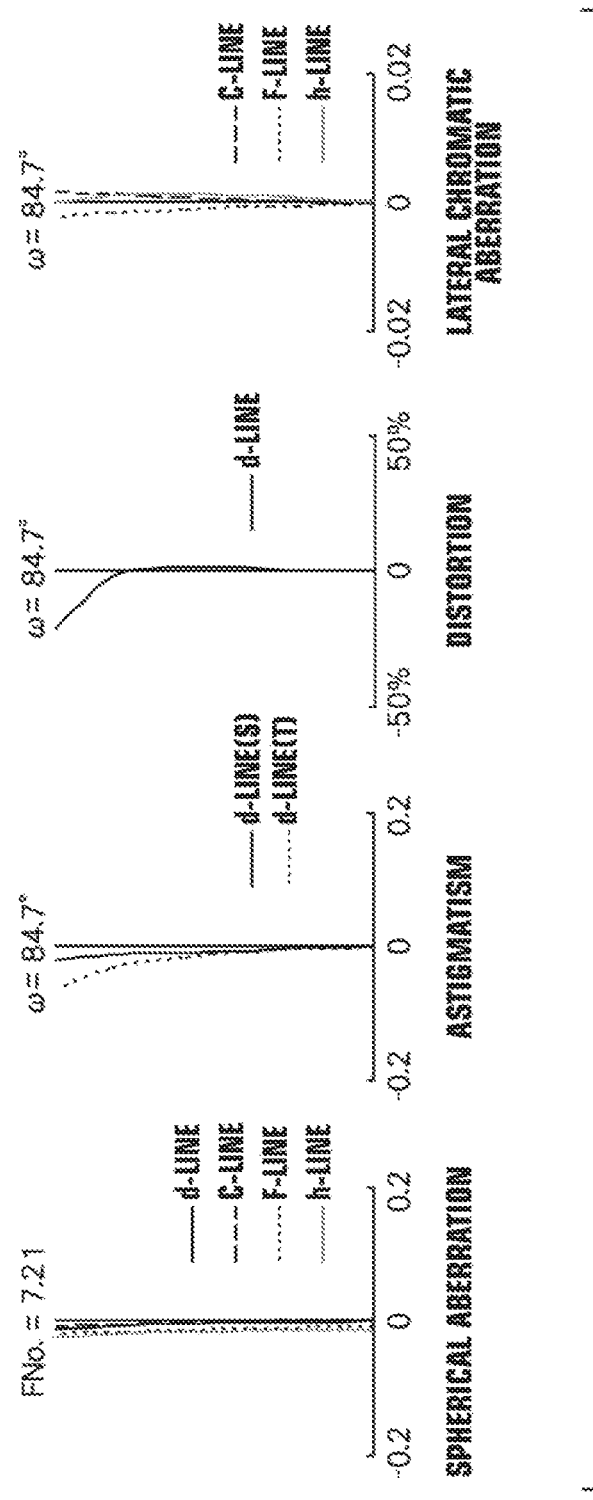
FIG. 25 is aberration diagrams of the objective lens for an endoscope in Example 11 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 11, FIG. 11 is a diagram illustrating the lens configuration and optical paths. Table 21 shows basic lens data and Table 22 shows specification. FIG. 25 illustrates aberration diagrams.

TABLE 21

| Si | Ri | Di | Ndj | vdj |
|---|---|---|---|---|
| OBJ | 8.54431 | 8.5443 | | |
| 1 | 5.99158 | 0.2492 | 1.88300 | 40.81 |
| 2 | 0.70807 | 0.2797 | | |
| 3 | 2.61659 | 0.2563 | 1.88300 | 40.81 |
| 4 | 0.71145 | 0.6168 | 1.72825 | 28.46 |
| 5 | −2.56520 | 0.1631 | | |
| 6 (St) | ∞ | 0.0580 | | |
| 7 | −1.57106 | 0.5547 | 1.59522 | 67.73 |
| 8 | −0.88712 | 0.0356 | | |
| 9 | 2.11345 | 0.7874 | 1.49700 | 81.54 |
| 10 | −0.86792 | 0.2492 | 1.84666 | 23.78 |
| 11 | −1.72057 | 0.2879 | | |
| 12 | ∞ | 2.1361 | 1.55920 | 53.92 |
| 13 | ∞ | 0.2136 | 1.51633 | 64.05 |
| 14 | ∞ | 0.0356 | | |
| IMG | ∞ | | | |

TABLE 22

| f | 1.000 |
|---|---|
| Bf | 1.722 |
| FNo. | 7.21 |
| 2ω [°] | 169.4 |

Example 12

Figure 12:
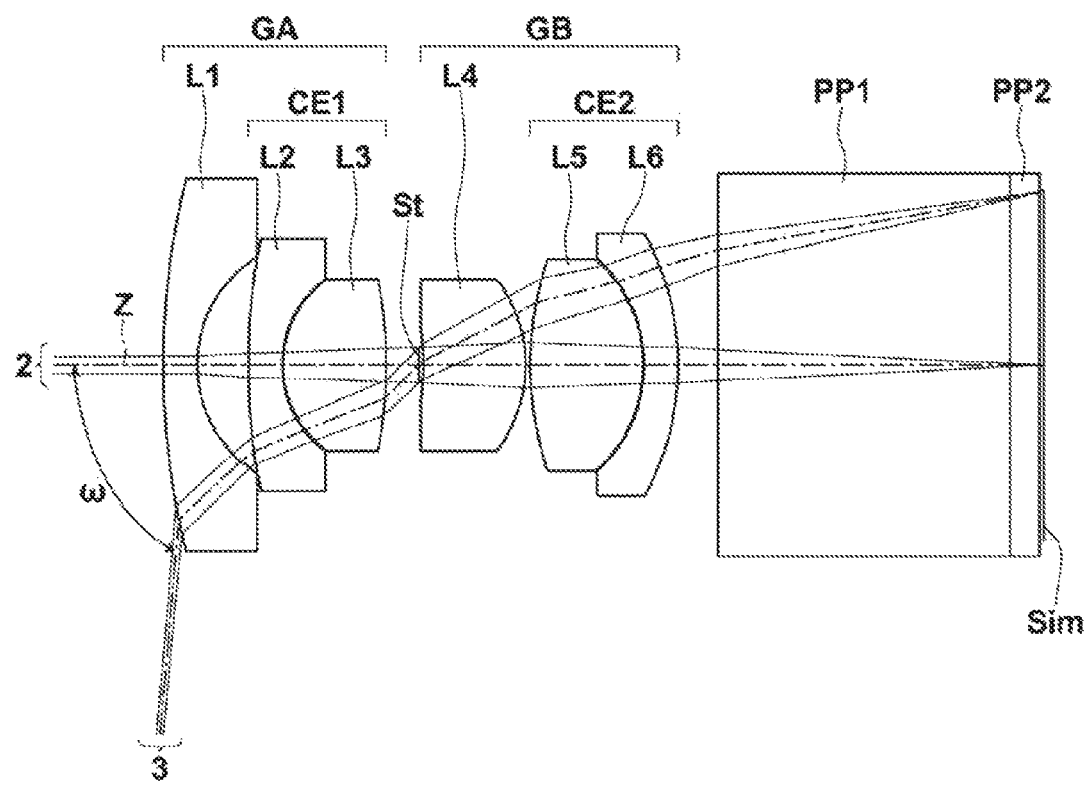
FIG. 12 is a sectional view illustrating the configuration of an objective lens for an endoscope in Example 12 of the present disclosure and optical paths.
Figure 26:
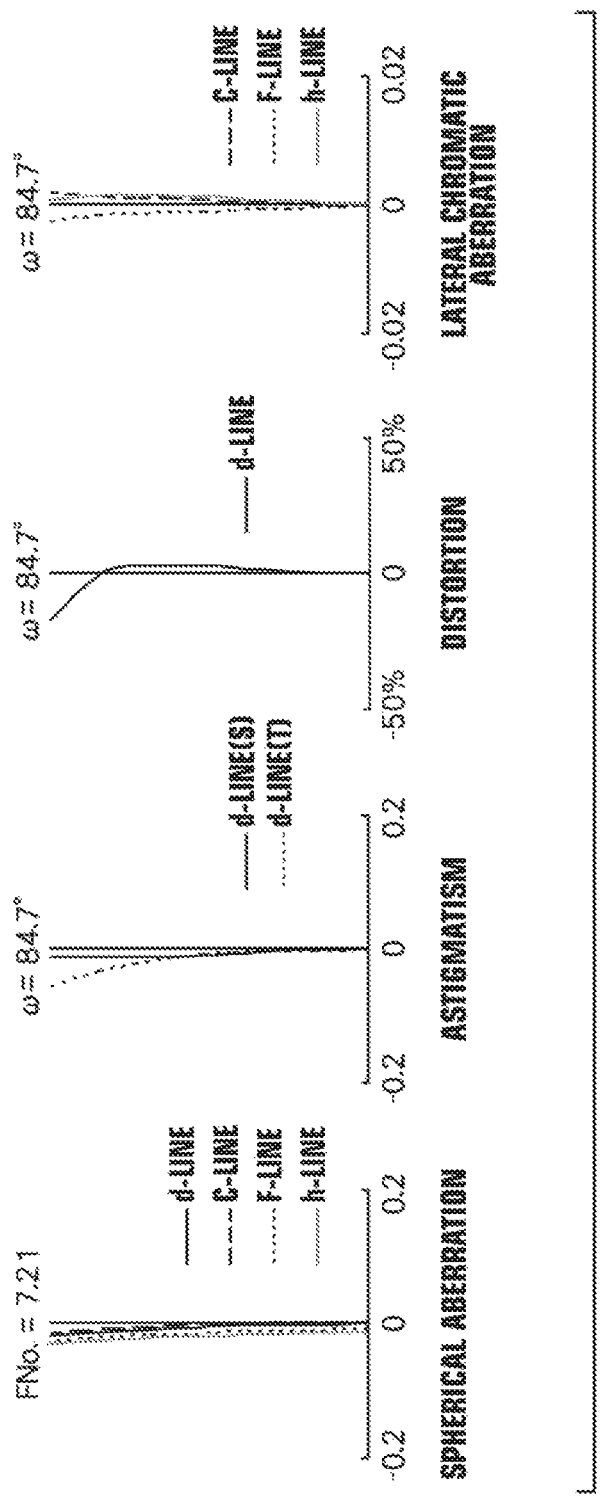
FIG. 26 is aberration diagrams of the objective lens for an endoscope in Example 12 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 12, FIG. 12 is a diagram illustrating the lens configuration and optical paths. Table 23 shows basic lens data and Table 24 shows specification. FIG. 26 illustrates aberration diagrams.

TABLE 23

| Si | Ri | Di | Ndj | vdj |
|---|---|---|---|---|
| OBJ | 8.85697 | 8.8570 | | |
| 1 | 5.45093 | 0.2583 | 1.88300 | 40.81 |
| 2 | 0.91687 | 0.3848 | | |
| 3 | 4.40589 | 0.2657 | 1.88300 | 40.81 |
| 4 | 0.76522 | 0.7827 | 1.72825 | 28.46 |
| 5 | −3.06617 | 0.2471 | | |
| 6 (St) | ∞ | 0.0334 | | |
| 7 | −1.70387 | 0.7764 | 1.59522 | 67.73 |
| 8 | −1.01233 | 0.0369 | | |
| 9 | 2.31090 | 0.8634 | 1.49700 | 81.54 |
| 10 | −1.02106 | 0.2583 | 1.84666 | 23.78 |
| 11 | −1.93043 | 0.3015 | | |
| 12 | ∞ | 2.2142 | 1.55920 | 53.92 |
| 13 | ∞ | 0.2214 | 1.51633 | 64.05 |
| 14 | ∞ | 0.0370 | | |
| IMG | ∞ | | | |

TABLE 24

| f | 1.000 |
|---|---|
| Bf | 1.798 |
| FNo. | 7.21 |
| 2ω [°] | 169.4 |

Example 13

Figure 13:
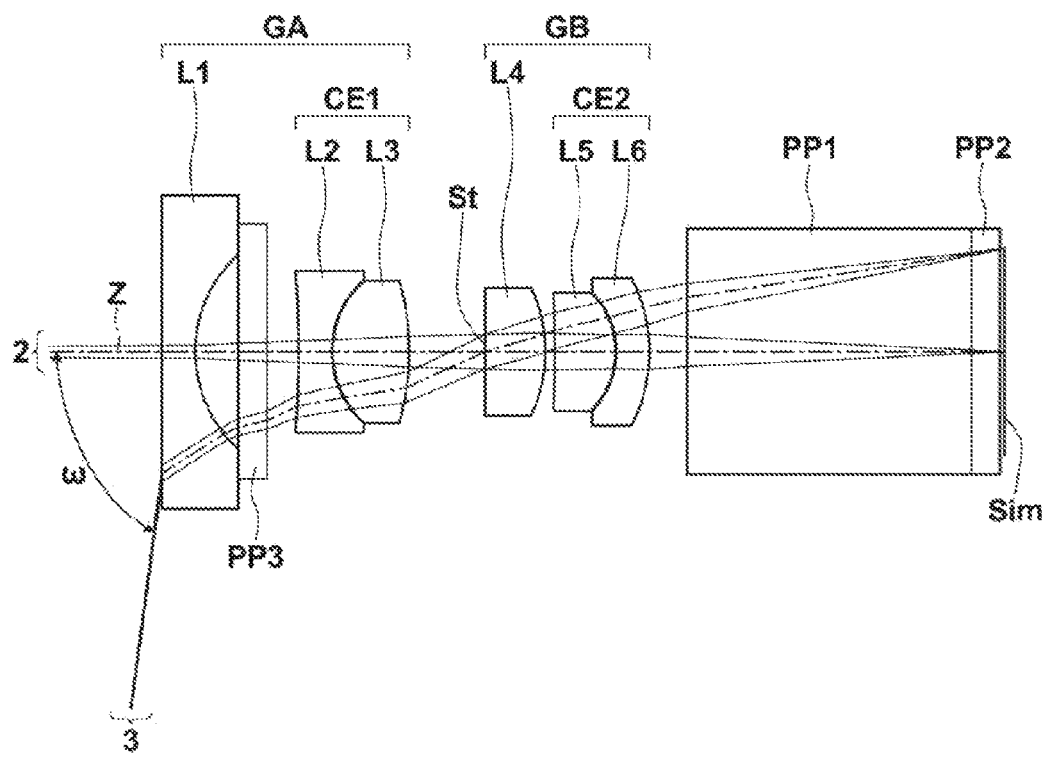
FIG. 13 is a sectional view illustrating the configuration of an objective lens for an endoscope in Example 13 of the present disclosure and optical paths.
Figure 27:
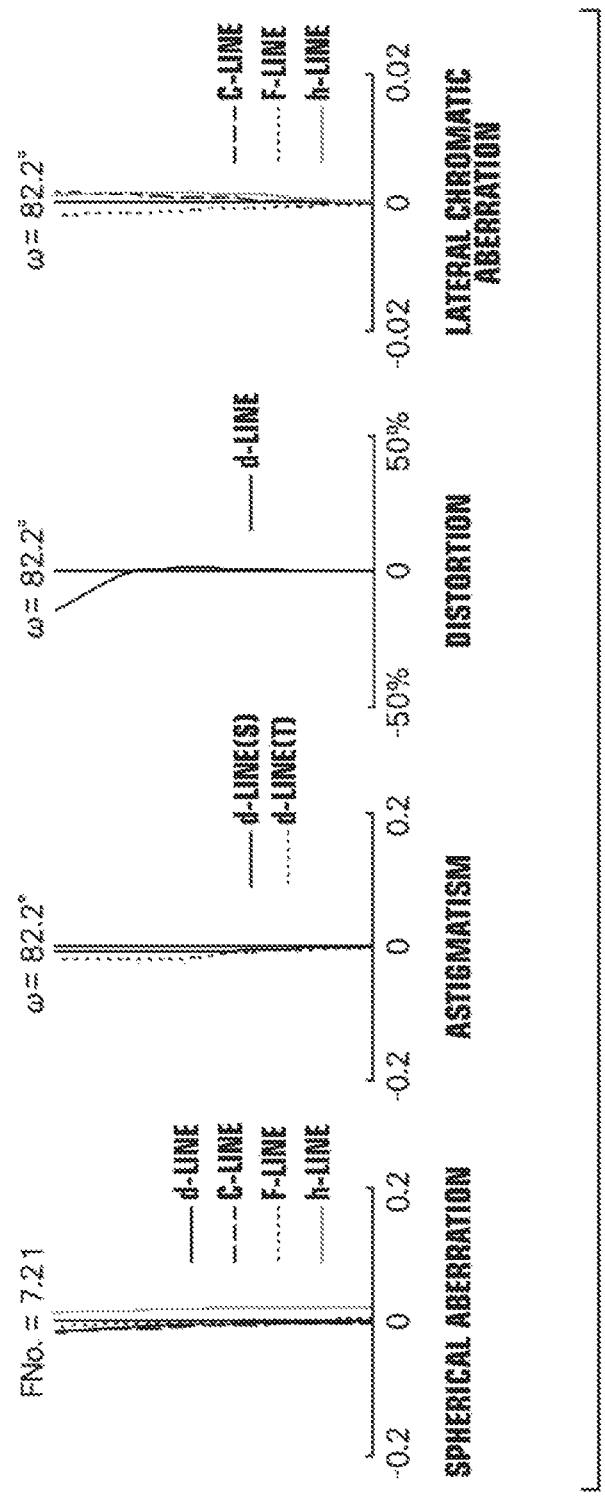
FIG. 27 is aberration diagrams of the objective lens for an endoscope in Example 13 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 13, FIG. 13 is a diagram illustrating the lens configuration and optical paths. Table 25 shows basic lens data and Table 26 shows specification. FIG. 27 illustrates aberration diagrams. In Example 13, parallel-flat-surface-shaped optical member PP3 is arranged immediately after first lens L1, i.e., toward the image side of first lens L1. However, optical member PP3 is not an essential composition element in the present disclosure.

TABLE 25

| Si | Ri | Di | Ndj | vdj |
|---|---|---|---|---|
| OBJ | 12.39642 | 12.3964 | | |
| 1 | ∞ | 0.3616 | 1.88299 | 40.78 |
| 2 | 1.34708 | 0.4702 | | |
| 3 | ∞ | 0.3099 | 1.88299 | 40.78 |
| 4 | ∞ | 0.3461 | | |
| 5 | −10.82105 | 0.3719 | 2.00100 | 29.13 |
| 6 | 0.98448 | 0.8349 | 1.84666 | 23.78 |
| 7 | −2.67143 | 0.8284 | | |
| 8 (St) | ∞ | 0.0000 | | |
| 9 | ∞ | 0.6608 | 1.49700 | 81.54 |
| 10 | −1.51959 | 0.1033 | | |
| 11 | −12.30965 | 0.6708 | 1.59522 | 67.73 |
| 12 | −0.85949 | 0.3616 | 1.84666 | 23.78 |
| 13 | −1.64666 | 0.4133 | | |
| 14 | ∞ | 3.0991 | 1.55920 | 53.92 |
| 15 | ∞ | 0.3099 | 1.51633 | 64.05 |
| 16 | ∞ | 0.0517 | | |
| IMG | ∞ | | | |

TABLE 26

| F | 1.000 |
|---|---|
| Bf | 2.582 |
| FNo. | 7.21 |
| 2ω [°] | 164.4 |

Example 14

Figure 14:
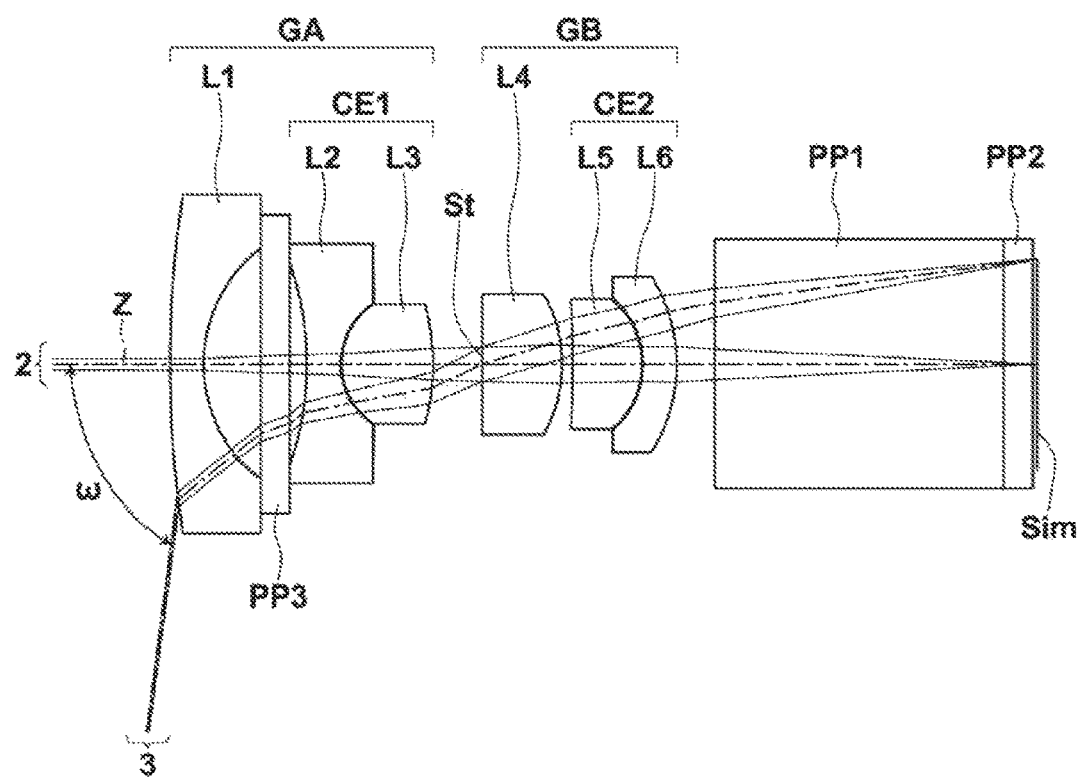
FIG. 14 is a sectional view illustrating the configuration of an objective lens for an endoscope in Example 14 of the present disclosure and optical paths.
Figure 28:
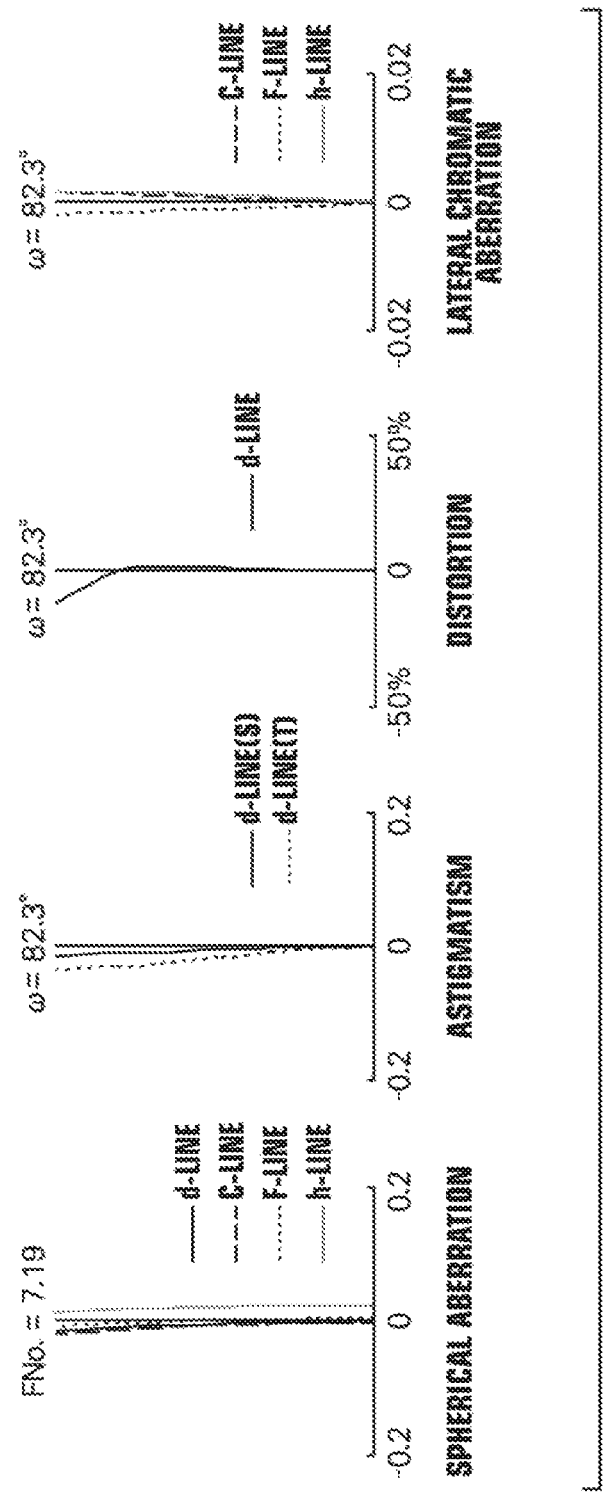
FIG. 28 is aberration diagrams of the objective lens for an endoscope in Example 14 of the present disclosure, which illustrate a spherical aberration diagram, an astigmatism diagram, a distortion diagram and a lateral chromatic aberration diagram from the left side of the sheet of paper.

Regarding an objective lens for an endoscope in Example 14, FIG. 14 is a diagram illustrating the lens configuration and optical paths. Table 27 shows basic lens data and Table 28 shows specification. FIG. 28 illustrates aberration diagrams. In Example 14, parallel-flat-surface-shaped optical member PP3 is arranged immediately after first lens L1, i.e., toward the image side of first lens L1. However, optical member PP3 is not an essential composition element in the present disclosure.

TABLE 27

| Si | Ri | Di | Ndj | vdj |
|---|---|---|---|---|
| OBJ | 12.88961 | 12.8896 | | |
| 1 | 11.64254 | 0.3759 | 1.88299 | 40.78 |
| 2 | 1.53172 | 0.6427 | | |
| 3 | ∞ | 0.3222 | 1.88299 | 40.78 |
| 4 | ∞ | 0.1904 | | |
| 5 | −3.15581 | 0.3866 | 2.00100 | 29.13 |
| 6 | 0.75512 | 1.0170 | 1.84666 | 23.78 |
| 7 | −2.33947 | 0.5493 | | |
| 8 (St) | ∞ | 0.0000 | | |
| 9 | ∞ | 0.8993 | 1.49700 | 81.54 |
| 10 | −1.48445 | 0.1165 | | |
| 11 | −13.47609 | 0.7851 | 1.59522 | 67.73 |
| 12 | −0.89368 | 0.3759 | 1.84666 | 23.78 |
| 13 | −1.71217 | 0.4239 | | |
| 14 | ∞ | 3.2224 | 1.55919 | 53.90 |
| 15 | ∞ | 0.3222 | 1.51633 | 64.06 |
| 16 | ∞ | 0.0539 | | |
| IMG | ∞ | | | |

TABLE 28

| f | 1.000 |
|---|---|
| Bf | 2.685 |
| FNo. | 7.19 |
| 2ω [°] | 164.6 |

Table 29 shows values corresponding to conditional expressions (1) through (6) for the objective lenses for endoscopes in Examples 1 through 14. Table 29 shows values for d-line.

TABLE 29

| EXPRESSION NUMBER | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| (1) | f/fA | −0.605 | −0.356 | −0.469 | −0.395 | −0.372 | −0.309 | −0.647 |
| (2) | \|vd2-vd3\| | 6.37 | 6.37 | 6.37 | 12.35 | 12.35 | 12.35 | 12.35 |
| (3) | f/f2 | −1.388 | −1.495 | −1.395 | −1.211 | −1.099 | −0.959 | −1.444 |
| (4) | f/f3 | 0.976 | 1.097 | 1.497 | 1.367 | 1.155 | 0.935 | 1.624 |
| (5) | \|vd5-vd6\| | 43.95 | 62.64 | 76.04 | 57.76 | 57.76 | 57.76 | 57.76 |
| (6) | dAB/f | 0.646 | 0.198 | 0.254 | 0.231 | 0.365 | 0.608 | 0.196 |
| EXPRESSION NUMBER | | EXAMPLE 8 | EXAMPLE 9 | EXAMPLE 10 | EXAMPLE 11 | EXAMPLE 12 | EXAMPLE 13 | EXAMPLE 14 |
| (1) | f/fA | −0.567 | −0.509 | −0.688 | −0.454 | −0.388 | −0.359 | −0.432 |
| (2) | \|vd2-vd3\| | 12.35 | 12.35 | 12.35 | 12.35 | 12.35 | 5.35 | 5.35 |
| (3) | f/f2 | −1.215 | −1.076 | −1.069 | −0.848 | −0.922 | −1.126 | −1.722 |
| (4) | f/f3 | 1.291 | 1.066 | 1.522 | 1.204 | 1.087 | 1.054 | 1.260 |
| (5) | \|vd5-vd6\| | 57.76 | 57.76 | 57.76 | 57.76 | 57.76 | 43.95 | 43.95 |
| (6) | dAB/f | 0.420 | 0.677 | 0.153 | 0.221 | 0.280 | 0.828 | 0.549 |

Figure 29:
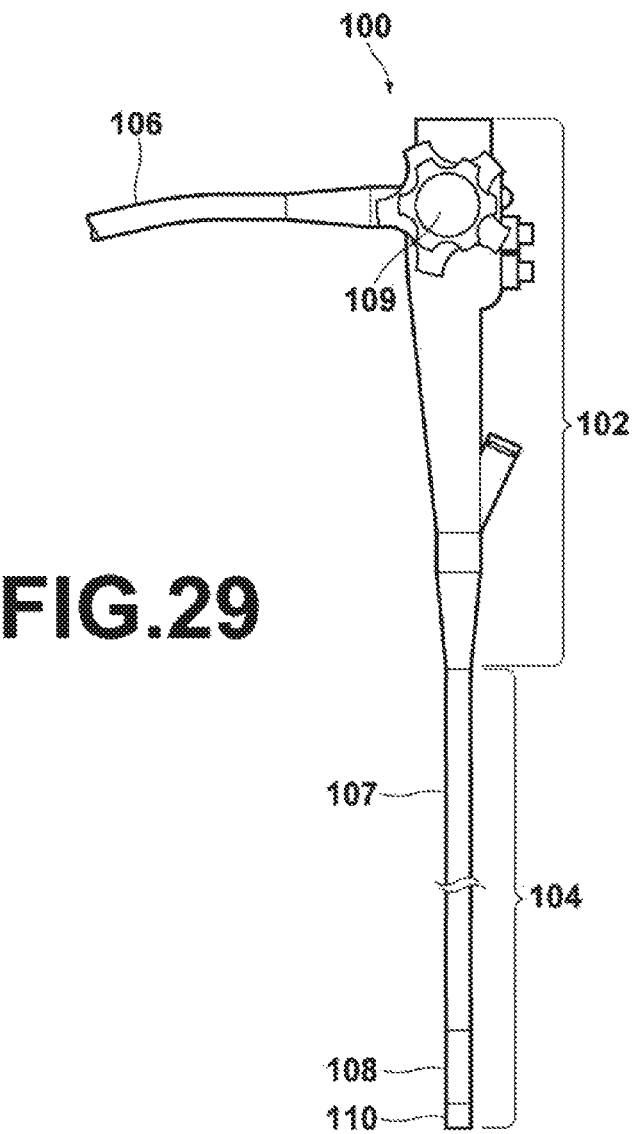
FIG. 29 is a schematic diagram illustrating the configuration of an endoscope according to an embodiment of the present disclosure.

Next, with reference to FIG. 29 and FIG. 30, an endoscope according to an embodiment of the present disclosure will be described. FIG. 29 is a schematic diagram illustrating the whole configuration of an endoscope using an objective lens for an endoscope according to an embodiment of the present disclosure, as an example of an endoscope according to an embodiment of the present disclosure. An endoscope 100 illustrated in FIG. 29 mainly includes an operation unit 102, an insertion part 104 and a universal cord 106 to be connected to a connector unit (not illustrated). A most part of the insertion part 104 is a flexible part 107 that bends in an arbitrary direction along an insertion path. A curving part 108 is connected to a leading end of this flexible part 107, and a leading end part 110 is connected to a leading end of this curving part 108. The curving part 108 is provided to direct the leading end part 110 toward a desirable direction. A curving operation is possible by turning a curving operation knob 109 provided in the operation unit 102.

Figure 30:
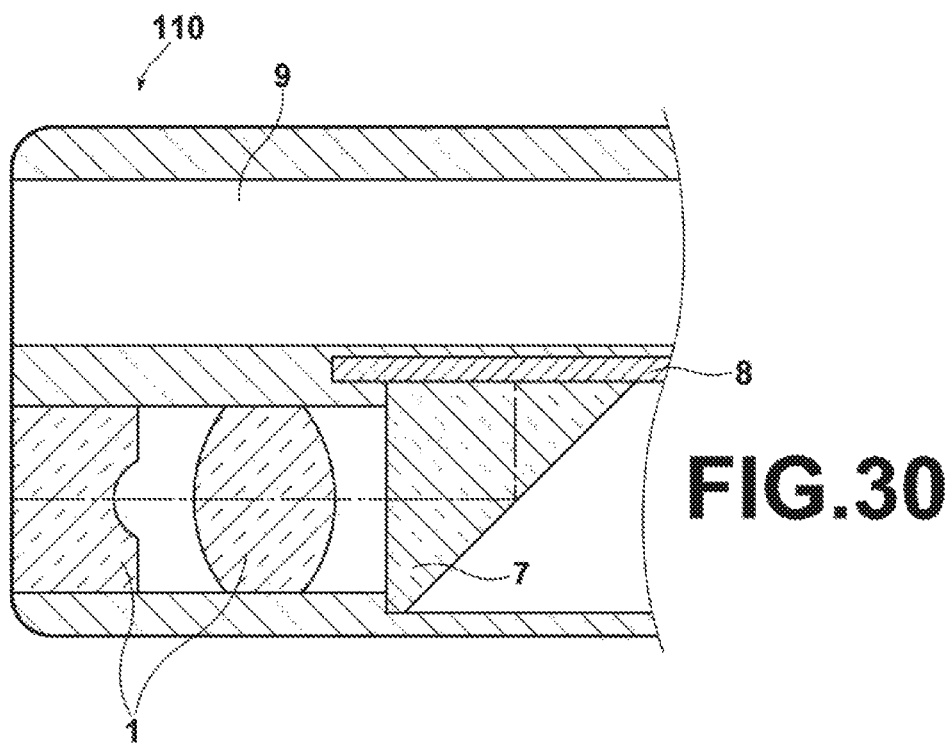
FIG. 30 is a sectional view illustrating a main part of a leading end part in an endoscope according to an embodiment of the present disclosure.

FIG. 30 is a sectional view illustrating a main part of the leading end part 110. A treatment tool insertion channel 9 is formed in an upper part of the inside of the leading end part 110. In a lower part of the inside of the leading end part 110, arranged are the objective lens 1 for an endoscope, the optical axis of which is arranged parallel to the direction of the longitudinal axis of the insertion part 104, an optical path conversion prism 7 for bending an optical path on the image side of the objective lens 1 for an endoscope by about 90 degrees, and a solid-state imaging device 8 cemented on the optical path conversion prism 7 in such a manner that a light receiving surface of the solid-state imaging device 8 is parallel to the direction of the longitudinal axis of the insertion part 104. In FIG. 30, the objective lens 1 for an endoscope is conceptually illustrated, and the optical axis of an observation optical system by the objective lens 1 for an endoscope is indicated by a dot dashed line. The solid-state imaging device 8 is arranged in such a manner that the imaging surface of the solid-state imaging device 8 coincides with the image plane of the objective lens 1 for an endoscope. An optical image formed by the objective lens 1 for an endoscope is imaged by the solid-state imaging device 8, and converted into electrical signals.

The endoscope according to the present embodiment includes the objective lens for an endoscope according to an embodiment of the present disclosure. Therefore, it is possible to perform observation in a wide field of view, and to obtain excellent images in a whole range from a short wavelength range in the vicinity of the wavelength of 400 nm to a visible range. Hence, the endoscope is appropriately adoptable in observation of an image in which blood vessels, a surface structure or the like has been emphasized, and which is obtainable by combining use of white light and laser light in the vicinity of the wavelength of 400 nm and image processing.

So far, the present disclosure has been described by using embodiments and examples. However, the present disclosure is not limited to the aforementioned embodiments nor examples, and various modifications are possible. For example, the values of a curvature radius, a distance between surfaces, a refractive index and an Abbe number of each lens are not limited to the values shown in the examples, but may be other values.

What is claimed is:

1. An objective lens for an endoscope consisting of, in order from the object side, a front group having negative refractive power, an aperture stop and a rear group having positive refractive power,
   wherein the front group consists of, in order from the object side, a first lens having negative refractive power and a first cemented lens consisting of, in order from the object side, a second lens having negative refractive power and a third lens having positive refractive power cemented together, and
   wherein the rear group consists of, in order from the object side, a fourth lens having positive refractive power and a second cemented lens consisting of, in order from the object side, a fifth lens having positive refractive power and a sixth lens having negative refractive power cemented together, and
   wherein the following conditional expressions (1) and (2) are satisfied:

$$-0.8 < f/fA < -0.2 \quad (1); \text{ and}$$

$$|vd2 - vd3| < 15.0 \quad (2), \text{ where}$$

f: a focal length of an entire system,
fA: a focal length of the front group,
vd2: an Abbe number of the second lens for d-line, and
vd3: an Abbe number of the third lens for d-line.

2. The objective lens for an endoscope, as defined in claim 1, wherein the following conditional expression (3) is satisfied:

$$-2.5 < f/f2 < -0.8 \quad (3), \text{ where}$$

f2: a focal length of the second lens.

3. The objective lens for an endoscope, as defined in claim 1, wherein the following conditional expression (4) is satisfied:

$$0.9 < f/f3 < 2.0 \quad (4), \text{ where}$$

f3: a focal length of the third lens.

4. The objective lens for an endoscope, as defined in claim 1, wherein the following conditional expression (5) is satisfied:

$$42.5 < |vd5 - vd6| < 100 \quad (5), \text{ where}$$

vd5: an Abbe number of the fifth lens for d-line, and
vd6: an Abbe number of the sixth lens for d-line.

5. The objective lens for an endoscope, as defined in claim 1, wherein the following conditional expression (6) is satisfied:

$$0.1 < dAB/f < 1.0 \quad (6), \text{ where}$$

dAB: a distance on an optical axis between the front group and the rear group.

6. The objective lens for an endoscope, as defined in claim 1, wherein the following conditional expression (1-1) is satisfied:

$$-0.7 < f/fA < -0.3 \quad (1\text{-}1).$$

7. The objective lens for an endoscope, as defined in claim 1, wherein the following conditional expression (2-1) is satisfied:

$$|vd2 - vd3| < 12.5 \quad (2\text{-}1).$$

8. The objective lens for an endoscope, as defined in claim 2, wherein the following conditional expression (3-1) is satisfied:

$$-2.0 < f/f2 < -0.85 \quad (3\text{-}1).$$

9. The objective lens for an endoscope, as defined in claim 3, wherein the following conditional expression (4-1) is satisfied:

$$0.95 < f/f3 < 1.65 \quad (4\text{-}1).$$

10. The objective lens for an endoscope, as defined in claim 4, wherein the following conditional expression (5-1) is satisfied:

$$43.5 < |vd5 - vd6| < 80 \quad (5\text{-}1).$$

11. The objective lens for an endoscope, as defined in claim 5, wherein the following conditional expression (6-1) is satisfied:

$$0.15 < dAB/f < 0.85 \quad (6\text{-}1).$$

12. An endoscope comprising:
the objective lens for an endoscope, as defined in claim 1.

* * * * *